United States Patent
Ballapuram et al.

(10) Patent No.: US 11,526,442 B2
(45) Date of Patent: Dec. 13, 2022

(54) METADATA MANAGEMENT FOR A CACHE

(71) Applicant: Micron Technology, Inc., Boise, ID (US)

(72) Inventors: Chinnakrishnan Ballapuram, San Jose, CA (US); Taeksang Song, San Jose, CA (US); Saira Samar Malik, Lafayette, IN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/390,097

(22) Filed: Jul. 30, 2021

(65) Prior Publication Data

US 2022/0035739 A1    Feb. 3, 2022

Related U.S. Application Data

(60) Provisional application No. 63/060,398, filed on Aug. 3, 2020.

(51) Int. Cl.
*G06F 12/00* (2006.01)
*G06F 12/0802* (2016.01)
*G06F 3/06* (2006.01)

(52) U.S. Cl.
CPC ........ G06F 12/0802 (2013.01); G06F 3/0604 (2013.01); G06F 3/0655 (2013.01); G06F 3/0679 (2013.01); *G06F 2212/72* (2013.01)

(58) Field of Classification Search
CPC .. G06F 12/0802; G06F 3/0604; G06F 3/0655; G06F 3/0679; G06F 2212/72
See application file for complete search history.

(56) References Cited

U.S. PATENT DOCUMENTS

2017/0322726 A1\* 11/2017 Walker .................. G06F 3/0679
2018/0365167 A1\* 12/2018 Eckert ................. G06F 12/1036

\* cited by examiner

*Primary Examiner* — Gurtej Bansal
(74) *Attorney, Agent, or Firm* — Holland & Hart LLP

(57) ABSTRACT

Methods, systems, and devices for metadata management for a cache are described. An interface controller may include a first array and a second array that store metadata for a cache memory. The interface controller may receive an activate command associated with a row of the cache memory. In response to the activate command, the interface controller may communicate storage information for the row of the volatile memory from a first array to a first register. The interface controller may receive an access command associated with the row of the cache memory. In response to the access command and based on the storage information in the first register, the interface controller may communicate validity information for the row from a second array to the first register or dirty information for the row from the second array to a second register.

22 Claims, 9 Drawing Sheets

METADATA MANAGEMENT FOR A CACHE

CROSS REFERENCE

The present Application for Patent claims the benefit of U.S. Provisional Patent Application No. 63/060,398 by BALLAPURAM et al., entitled "METADATA MANAGEMENT FOR A CACHE," filed Aug. 3, 2020, assigned to the assignee hereof, and expressly incorporated by reference in its entirety herein.

BACKGROUND

The following relates generally to one or more memory systems and more specifically to a metadata management for a cache.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
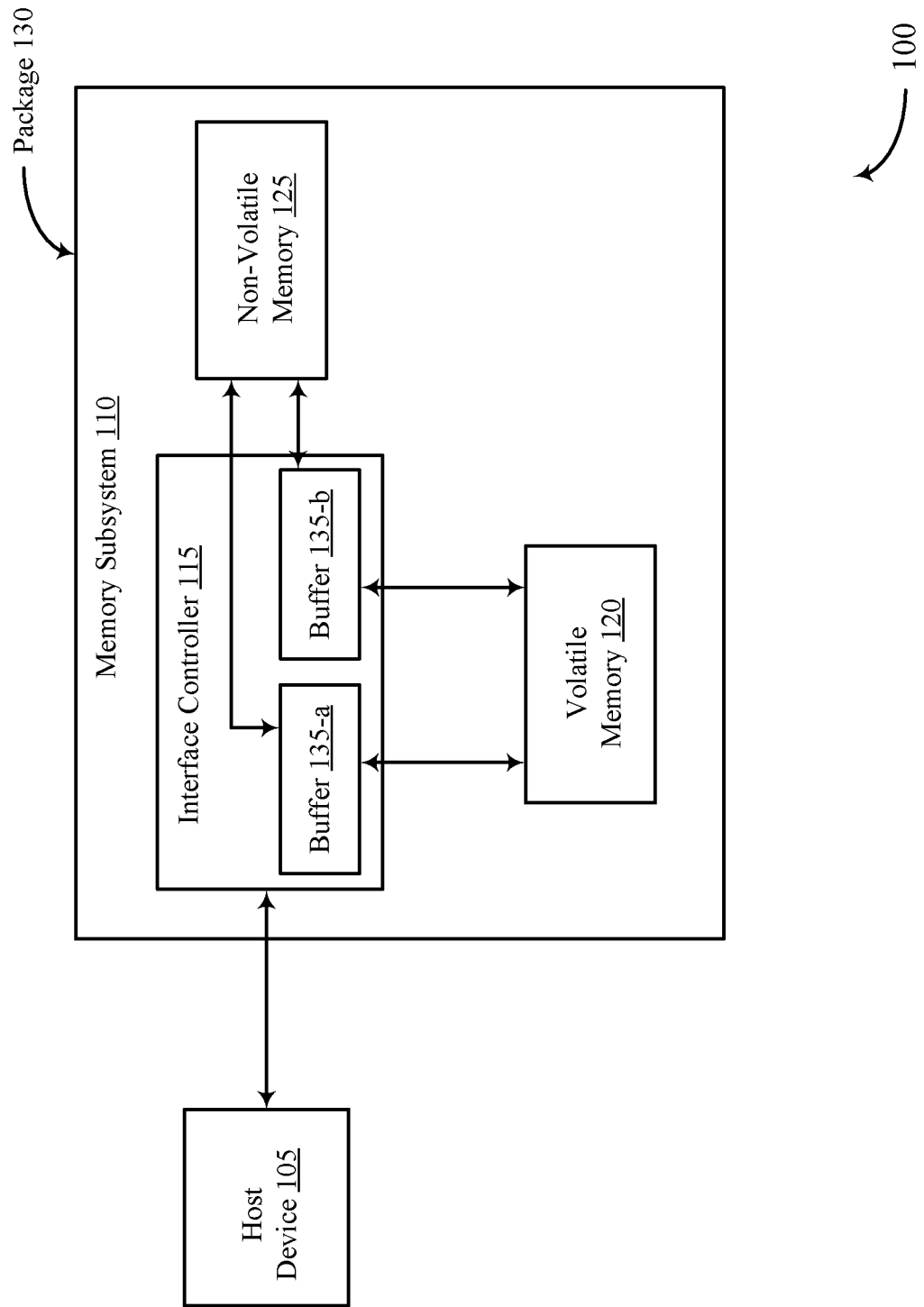
FIG. 1 illustrates an example of a system that supports metadata management for a cache in accordance with examples as disclosed herein.

A device, such as an electronic device, may include a main memory (e.g., a primary memory for storing information among other operations) and a secondary memory that may operate as a cache. To operate the secondary memory as a cache, the device may use metadata that provides information about data in one or more portions of the secondary memory. For example, the device may use tag information as one form of metadata that indicates which data from the main memory is cached in the secondary memory. The device may also use validity information as one form of metadata that indicates whether the data stored in a portion of the secondary memory is actual data (e.g., data previously written to the portion) or garbage data (e.g., data such as random data stored by the portion upon initialization, start-up, reset, or some other procedure). And the device may use dirty information as one form of metadata that indicates whether the data stored in a portion of the secondary memory has been modified since it was stored in main memory or is missing from main memory altogether.

A device may store the metadata for one memory, such as a secondary memory, in one or more memory arrays that are different than the one memory (e.g., secondary memory). But accessing the memory array(s) each time an access command is received and serviced, as may be done with other different techniques, may increase latency and consume excess processing resources, among other disadvantages.

According to the techniques described herein, a device may reduce latency and conserve processing resources, among other advantages, by strategically communicating metadata from one or memory arrays to one or more registers. For example, in response to an activate command from a host device, the device may communicate tag information from a first memory array to a first register. When a corresponding read command or write command is received by the host device, the device may reference the tag information in the first register—as opposed to the first memory array—to be able to quickly determine whether there is a cache hit or miss. In the event of a cache hit, the device may communicate validity information from a second memory array to the first register so that the device can quickly determine which data is valid (and thus should be returned to the host device). In the event of a cache miss, the device may communicate dirty information from the second memory array to a second register so that the device can quickly determine which data is dirty (and thus should be saved to the main memory during an eviction process).

Features of the disclosure are initially described in the context of a memory system and subsystem as described with reference to FIGS. 1 and 2. Features of the disclosure are described in the context a device and process flows as described with reference to FIGS. 3-5. These and other features of the disclosure are further illustrated by and described with reference to an apparatus diagram and flowcharts that relate to metadata management for a cache as described with reference to FIGS. 6-9.

FIG. 1 illustrates an example of a memory system 100 that supports metadata management for a cache in accordance with examples as disclosed herein. The memory system 100 may be included in an electronic device such a computer or phone. The memory system 100 may include a host device 105 and a memory subsystem 110. The host device 105 may be a processor or system-on-a-chip (SoC) that interfaces with the interface controller 115 as well as other components of the electronic device that includes the memory system 100. The memory subsystem 110 may store and provide access to electronic information (e.g., digital information, data) for the host device 105. The memory subsystem 110 may include an interface controller 115, a volatile memory 120, and a non-volatile memory 125. In some examples, the interface controller 115, the volatile memory 120, and the non-volatile memory 125 may be included in a same physical package such as a package 130. However, the interface controller 115, the volatile memory 120, and the non-volatile memory 125 may be disposed on different, respective dies (e.g., silicon dies).

The devices in the memory system 100 may be coupled by various conductive lines (e.g., traces, printed circuit board (PCB) routing, redistribution layer (RDL) routing) that may enable the communication of information (e.g., commands, addresses, data) between the devices. The conductive lines may make up channels, data buses, command buses, address buses, and the like.

The memory subsystem 110 may be configured to provide the benefits of the non-volatile memory 125 while maintaining compatibility with a host device 105 that supports protocols for a different type of memory, such as the volatile memory 120, among other examples. For example, the non-volatile memory 125 may provide benefits (e.g., relative to the volatile memory 120) such as non-volatility, higher capacity, or lower power consumption. But the host device 105 may be incompatible or inefficiently configured with various aspects of the non-volatile memory 125. For instance, the host device 105 may support voltages, access latencies, protocols, page sizes, etc. that are incompatible with the non-volatile memory 125. To compensate for the incompatibility between the host device 105 and the non-volatile memory 125, the memory subsystem 110 may be configured with the volatile memory 120, which may be compatible with the host device 105 and serve as a cache for the non-volatile memory 125. Thus, the host device 105 may use protocols supported by the volatile memory 120 while benefitting from the advantages of the non-volatile memory 125.

In some examples, the memory system 100 may be included in, or coupled with, a computing device, electronic device, mobile computing device, or wireless device. The device may be a portable electronic device. For example, the device may be a computer, a laptop computer, a tablet computer, a smartphone, a cellular phone, a wearable device, an internet-connected device, or the like. In some examples, the device may be configured for bi-directional wireless communication via a base station or access point. In some examples, the device associated with the memory system 100 may be capable of machine-type communication (MTC), machine-to-machine (M2M) communication, or device-to-device (D2D) communication. In some examples, the device associated with the memory system 100 may be referred to as a user equipment (UE), station (STA), mobile terminal, or the like.

The host device 105 may be configured to interface with the memory subsystem 110 using a first protocol (e.g., low-power double data rate (LPDDR)) supported by the interface controller 115. Thus, the host device 105 may, in some examples, interface with the interface controller 115 directly and the non-volatile memory 125 and the volatile memory 120 indirectly. In alternative examples, the host device 105 may interface directly with the non-volatile memory 125 and the volatile memory 120. The host device 105 may also interface with other components of the electronic device that includes the memory system 100. The host device 105 may be or include an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host device 105 may be referred to as a host.

The interface controller 115 may be configured to interface with the volatile memory 120 and the non-volatile memory 125 on behalf of the host device 105 (e.g., based on one or more commands or requests issued by the host device 105). For instance, the interface controller 115 may facilitate the retrieval and storage of data in the volatile memory 120 and the non-volatile memory 125 on behalf of the host device 105. Thus, the interface controller 115 may facilitate data transfer between various subcomponents, such as between at least some of the host device 105, the volatile memory 120, or the non-volatile memory 125. The interface controller 115 may interface with the host device 105 and the volatile memory 120 using the first protocol and may interface with the non-volatile memory 125 using a second protocol supported by the non-volatile memory 125.

The non-volatile memory 125 may be configured to store digital information (e.g., data) for the electronic device that includes the memory system 100. Accordingly, the non-volatile memory 125 may include an array or arrays of memory cells and a local memory controller configured to operate the array(s) of memory cells. In some examples, the memory cells may be or include FeRAM cells (e.g., the non-volatile memory 125 may be FeRAM). The non-volatile memory 125 may be configured to interface with the interface controller 115 using the second protocol that is different than the first protocol used between the interface controller 115 and the host device 105. In some examples, the non-volatile memory 125 may have a longer latency for access operations than the volatile memory 120. For example, retrieving data from the non-volatile memory 125 may take longer than retrieving data from the volatile memory 120. Similarly, writing data to the non-volatile memory 125 may take longer than writing data to the volatile memory 120. In some examples, the non-volatile memory 125 may have a smaller page size than the volatile memory 120, as described herein.

The volatile memory 120 may be configured to operate as a cache for one or more components, such as the non-volatile memory 125. For example, the volatile memory 120 may store information (e.g., data) for the electronic device that includes the memory system 100. Accordingly, the volatile memory 120 may include an array or arrays of memory cells and a local memory controller configured to operate the array(s) of memory cells. In some examples, the memory cells may be or include DRAM cells (e.g., the volatile memory may be DRAM). The non-volatile memory 125 may be configured to interface with the interface controller 115 using the first protocol that is used between the interface controller 115 and the host device 105.

In some examples, the volatile memory 120 may have a shorter latency for access operations than the non-volatile memory 125. For example, retrieving data from the volatile memory 120 may take less time than retrieving data from the non-volatile memory 125. Similarly, writing data to the volatile memory 120 may take less time than writing data to the non-volatile memory 125. In some examples, the volatile memory 120 may have a larger page size than the non-volatile memory 125. For instance, the page size of volatile memory 120 may be 2 kilobytes (2 kB) and the page size of non-volatile memory 125 may be 64 bytes (64 B) or 128 bytes (128 B).

Although the non-volatile memory 125 may be a higher-density memory than the volatile memory 120, accessing the non-volatile memory 125 may take longer than accessing the volatile memory 120 (e.g., due to different architectures and protocols, among other reasons). Accordingly, operating the volatile memory 120 as a cache may reduce latency in the memory system 100. As an example, an access request for data from the host device 105 may be satisfied relatively quickly by retrieving the data from the volatile memory 120 rather than from the non-volatile memory 125. To facilitate operation of the volatile memory 120 as a cache, the interface controller 115 may include multiple buffers 135. The buffers 135 may be disposed on the same die as the interface controller 115 and may be configured to temporarily store data for transfer between the volatile memory 120, the non-volatile memory 125, or the host device 105 (or any combination thereof) during one or more access operations (e.g., storage and retrieval operations).

An access operation may also be referred to as an access process or access procedure and may involve one or more sub-operations that are performed by one or more of the components of the memory subsystem 110. Examples of access operations may include storage operations in which data provided by the host device 105 is stored (e.g., written to) in the volatile memory 120 or the non-volatile memory 125 (or both), and retrieval operations in which data requested by the host device 105 is obtained (e.g., read) from the volatile memory 120 or the non-volatile memory 125 and is returned to the host device 105.

To store data in the memory subsystem 110, the host device 105 may initiate a storage operation (or "storage process") by transmitting a storage command (also referred to as a storage request, a write command, or a write request) to the interface controller 115. The storage command may target a set of non-volatile memory cells in the non-volatile memory 125. In some examples, a set of memory cells may also be referred to as a portion of memory. The host device 105 may also provide the data to be written to the set of non-volatile memory cells to the interface controller 115. The interface controller 115 may temporarily store the data in the buffer 135-a. After storing the data in the buffer 135-a, the interface controller 115 may transfer the data from the buffer 135-a to the volatile memory 120 or the non-volatile memory 125 or both. In write-through mode, the interface controller 115 may transfer the data to both the volatile memory 120 and the non-volatile memory 125. In write-back mode, the interface controller 115 may only transfer the data to the volatile memory 120 (with the data being transferred to the non-volatile memory 125 during a later eviction process).

In either mode, the interface controller 115 may identify an appropriate set of one or more volatile memory cells in the volatile memory 120 for storing the data associated with the storage command. To do so, the interface controller 115 may implement set-associative mapping in which each set (e.g., block) of one or more non-volatile memory cells in the non-volatile memory 125 may be mapped to multiple sets of volatile memory cells in the volatile memory 120. For instance, the interface controller 115 may implement n-way associative mapping which allows data from a set of non-volatile memory cells to be stored in one of n sets of volatile memory cells in the volatile memory 120. Thus, the interface controller 115 may manage the volatile memory 120 as a cache for the non-volatile memory 125 by referencing the n sets of volatile memory cells associated with a targeted set of non-volatile memory cells. As used herein, a "set" of objects may refer to one or more of the objects unless otherwise described or noted. Although described with reference to set-associative mapping, the interface controller 115 may manage the volatile memory 120 as a cache by implementing one or more other types of mapping such as direct mapping or associative mapping, among other examples.

After determining which n sets of volatile memory cells are associated with the targeted set of non-volatile memory cells, the interface controller 115 may store the data in one or more of the n sets of volatile memory cells. This way, a subsequent retrieval command from the host device 105 for the data can be efficiently satisfied by retrieving the data from the lower-latency volatile memory 120 instead of retrieving the data from the higher-latency non-volatile memory 125. The interface controller 115 may determine which of the n sets of the volatile memory 120 to store the data based on one or more parameters associated with the data stored in the n sets of the volatile memory 120, such as the validity, age, or modification status of the data. Thus, a storage command by the host device 105 may be wholly (e.g., in write-back mode) or partially (e.g., in write-through mode) satisfied by storing the data in the volatile memory 120. To track the data stored in the volatile memory 120, the interface controller 115 may store for one or more sets of volatile memory cells (e.g., for each set of volatile memory cells) a tag address that indicates the non-volatile memory cells with data stored in a given set of volatile memory cells.

To retrieve data from the memory subsystem 110, the host device 105 may initiate a retrieval operation (also referred to as a retrieval process) by transmitting a retrieval command (also referred to as a retrieval request, a read command, or a read request) to the interface controller 115. The retrieval command may target a set of one or more non-volatile memory cells in the non-volatile memory 125. Upon receiving the retrieval command, the interface controller 115 may check for the requested data in the volatile memory 120. For instance, the interface controller 115 may check for the requested data in the n sets of volatile memory cells associated with the targeted set of non-volatile memory cells. If one of the n sets of volatile memory cells stores the requested data (e.g., stores data for the targeted set of non-volatile memory cells), the interface controller 115 may transfer the data from the volatile memory 120 to the buffer 135-a (e.g., in response to determining that one of the n sets of volatile memory cells stores the requested data, as described in FIGS. 4 and 5) so that it can be transmitted to the host device 105. The term "hit" may be used to refer to the scenario where the volatile memory 120 stores data requested by the host device 105. If the n sets of one or more volatile memory cells do not store the requested data (e.g., the n sets of volatile memory cells store data for a set of non-volatile memory cells other than the targeted set of non-volatile memory cells), the interface controller 115 may transfer the requested data from the non-volatile memory 125 to the buffer 135-a (e.g., in response to determining that the n sets of volatile memory cells do not store the requested data, as described with reference to FIGS. 4 and 5) so that it can be transmitted to the host device 105. The term "miss" may be used to refer to the scenario where the volatile memory 120 does not store data requested by the host device 105.

In a miss scenario, after transferring the requested data to the buffer 135-a, the interface controller 115 may transfer the requested data from the buffer 135-a to the volatile memory 120 so that subsequent read requests for the data can be satisfied by the volatile memory 120 instead of the non-volatile memory 125. For example, the interface controller 115 may store the data in one of the n sets of volatile memory cells associated with the targeted set of non-volatile memory cells. But the n sets of volatile memory cells may already be storing data for other sets of non-volatile memory cells. So, to preserve this other data, the interface controller 115 may transfer the other data to the buffer 135-b so that it can be transferred to the non-volatile memory 125 for storage. Such a process may be referred to as "eviction" and the data transferred from the volatile memory 120 to the buffer 135-b may be referred to as "victim" data. In some cases, the interface controller 115 may transfer a subset of the victim data from the buffer 135-b to the non-volatile memory 125. For example, the interface controller 115 may transfer one or more subsets of victim data that have changed since the data was initially stored in the non-volatile memory 125. Data that is inconsistent between the volatile memory 120 and the non-volatile memory 125 (e.g., due to an update in one memory and not the other) may be referred to in some cases as "modified" or "dirty" data. In some examples (e.g., when interface controller operates in one mode such as a write-back mode), dirty data may be data that is present in the volatile memory 120 but not present in the non-volatile memory 125.

In some examples, the interface controller 115 may operate the volatile memory 120 as a cache based on metadata that provides information about the data stored in the volatile memory 120. For example, the interface controller 115 may use metadata, such as tag information, validity information, and/or dirty information, among other examples, to manage the volatile memory 120 as a cache. Tag information may include, in some examples, information that indicates which data from the non-volatile memory 125 is stored in the volatile memory 120. Validity information may include information that indicates whether data stored in the volatile memory 120 is valid data (e.g., actual data stored in the volatile memory 120 based on a command from the host device 105) or invalid data (e.g., garbage data unintentionally stored or stored as a placeholder in the volatile memory 120 upon initialization, start-up, or some other procedure). So, the interface controller 115 may determine a cache hit or miss by referencing tag information and validity information for the volatile memory 120.

Dirty information may include information that indicates whether data stored in the volatile memory 120 is inconsistent with data stored in the non-volatile memory 125. For example, dirty information may indicate whether data stored in the volatile memory 120 1) has been modified since it was stored in the non-volatile memory 125 or 2) is absent from the non-volatile memory 125. So, the interface controller 115 may perform an eviction process (e.g., in the event of a cache miss) by referencing dirty information for the volatile memory 120.

In some examples, the memory subsystem 110 may store tag information, validity information, and dirty information in one or more arrays included in the interface controller 115. But this other different storage technique may increase latency associated with servicing access commands if the interface controller 115 accesses the memory array(s) multiple times to service the access commands.

According to the techniques described herein, the memory subsystem 110 may reduce latency, among other advantages, by strategically moving tag information, validity information, and dirty information from one or more memory array(s) to one or more registers that are easier and/or quicker to access relative to the memory array(s).

In some examples, validity information may be referred to herein as validity flags, validity bits, or other suitable terminology. Similarly, dirty information may be referred to herein as dirty flags, dirty bits, or other suitable terminology.

Figure 2:
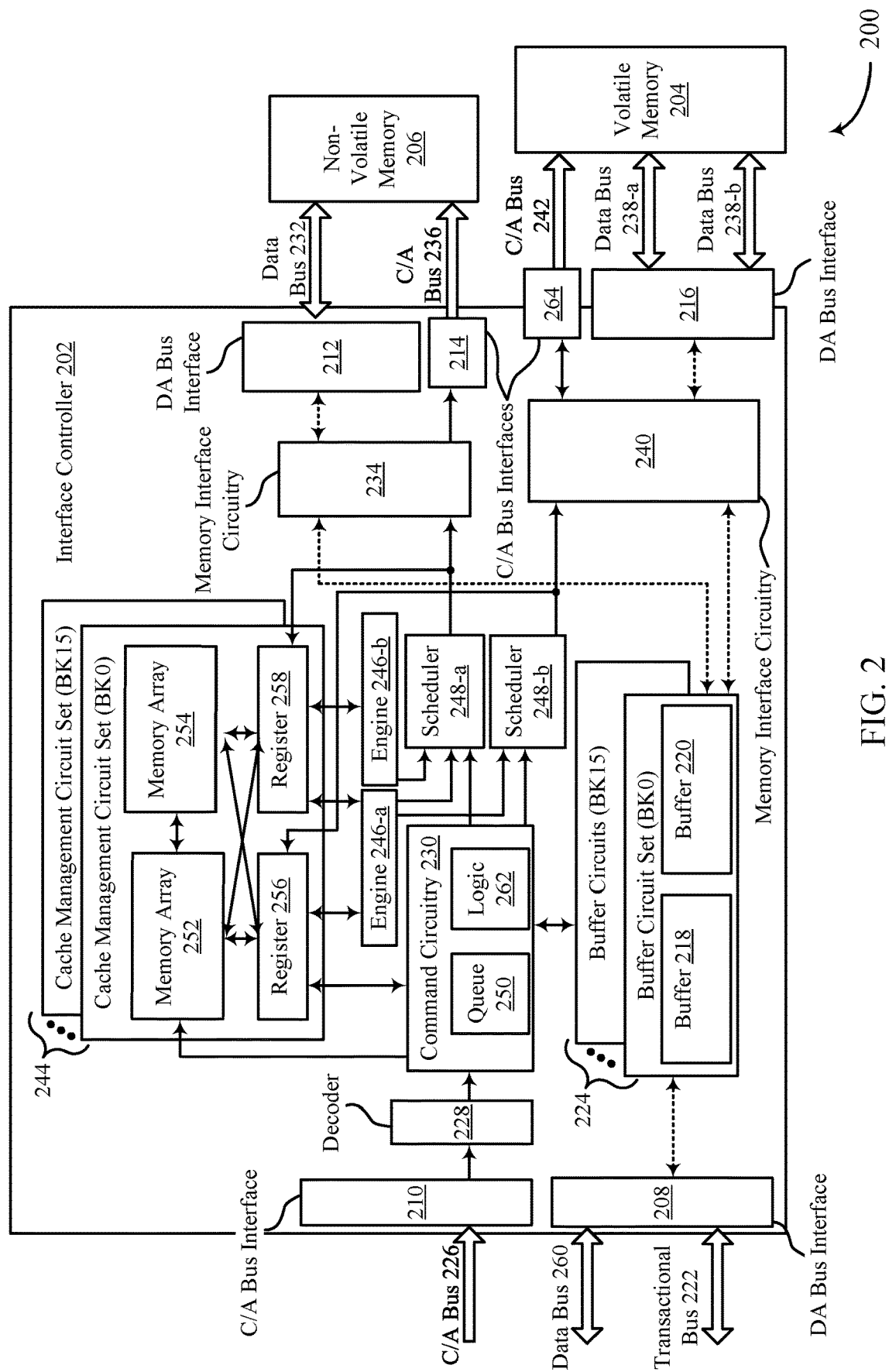
FIG. 2 illustrates an example of a memory subsystem that metadata management for a cache in accordance with examples as disclosed herein.

FIG. 2 illustrates an example of a memory subsystem 200 that supports metadata management for a cache in accordance with examples as disclosed herein. The memory subsystem 200 may be an example of the memory subsystem 110 described with reference to FIG. 1. Accordingly, the memory subsystem 200 may interact with a host device as described with reference to FIG. 1. The memory subsystem 200 may include an interface controller 202, a volatile memory 204, and a non-volatile memory 206, which may be examples of the interface controller 115, the volatile memory 120, and the non-volatile memory 125, respectively, as described with reference to FIG. 1. Thus, the interface controller 202 may interface with the volatile memory 204 and the non-volatile memory 206 on behalf of the host device as described with reference to FIG. 1. For example, the interface controller 202 may operate the volatile memory 204 as a cache for the non-volatile memory 206. Operating the volatile memory 204 as the cache may allow subsystem to provide the benefits of the non-volatile memory 206 (e.g., non-volatile, high-density storage) while maintaining compatibility with a host device that supports a different protocol than the non-volatile memory 206.

In FIG. 2, dashed lines between components represent the flow of data or communication paths for data and solid lines between components represent the flow of commands or communication paths for commands. In some cases, the memory subsystem 200 is one of multiple similar or identical subsystems that may be included in an electronic device. Each subsystem may be referred to as a slice and may be associated with a respective channel of a host device in some examples.

The non-volatile memory 206 may be configured to operate as a main memory (e.g., memory for long-term data storage) for a host device. In some cases, the non-volatile memory 206 may include one or more arrays of FeRAM cells. Each FeRAM cell may include a selection component and a ferroelectric capacitor and may be accessed by applying appropriate voltages to one or more access lines such as word lines, plates lines, and digit lines. In some examples, a subset of FeRAM cells coupled with to an activated word line may be sensed, for example concurrently or simultaneously, without having to sense all FeRAM cells coupled with the activated word line. Accordingly, a page size for an FeRAM array may be different than (e.g., smaller than) a DRAM page size. In the context of a memory device, a page may refer to the memory cells in a row (e.g., a group of the memory cells that have a common row address) and a page size may refer to the number of memory cells or column addresses in a row, or the number of column addresses accessed during an access operation. Alternatively, a page size may refer to a size of data handled by various interfaces or the amount of data a row is capable of storing. In some cases, different memory device types may have different page sizes. For example, a DRAM page size (e.g., 2 kB) may be a superset of a non-volatile memory (e.g., FeRAM) page size (e.g., 64 B).

A smaller page size of an FeRAM array may provide various efficiency benefits, as an individual FeRAM cell may require more power to read or write than an individual DRAM cell. For example, a smaller page size for an FeRAM array may facilitate effective energy usage because a smaller number of FeRAM cells may be activated when an associated change in information is minor. In some examples, the page size for an array of FeRAM cells may vary, for example dynamically (e.g., during operation of the array of FeRAM cells) depending on the nature of data and command utilizing FeRAM operation.

Although an individual FeRAM cell may require more power to read or write than an individual DRAM cell, an FeRAM cell may maintain its stored logic state for an extended period of time in the absence of an external power source, as the ferroelectric material in the FeRAM cell may maintain a non-zero electric polarization in the absence of an electric field. Therefore, including an FeRAM array in the non-volatile memory 206 may provide efficiency benefits relative to volatile memory cells (e.g., DRAM cells in the volatile memory 204), as it may reduce or eliminate requirements to perform refresh operations.

The volatile memory 204 may be configured to operate as a cache for the non-volatile memory 206. In some cases, the volatile memory 204 may include one or more arrays of DRAM cells. Each DRAM cell may include a capacitor that includes a dielectric material to store a charge representative of the programmable state. The memory cells of the volatile memory 204 may be logically grouped or arranged into one or more memory banks (as referred to herein as "banks"). For example, volatile memory 204 may include sixteen banks. The memory cells of a bank may be arranged in a grid or an array of intersecting columns and rows and each memory cell may be accessed or refreshed by applying appropriate voltages to the digit line (e.g., column line) and word line (e.g., row line) for that memory cell. The rows of a bank may be referred to pages, and the page size may refer to the number of columns or memory cells in a row (and thus, the amount of data a row is capable of storing). As noted, the page size of the volatile memory 204 may be different than (e.g., larger than) the page size of the non-volatile memory 206.

The interface controller 202 may include various circuits for interfacing (e.g., communicating) with other devices, such as a host device, the volatile memory 204, and the non-volatile memory 206. For example, the interface controller 202 may include a data (DA) bus interface 208, a command and address (C/A) bus interface 210, a data bus interface 212, a C/A bus interface 214, a data bus interface 216, and a C/A bus interface 264. The data bus interfaces may support the communication of information using one or more communication protocols. For example, the data bus interface 208, the C/A bus interface 210, the data bus interface 216, and the C/A bus interface 264 may support information that is communicated using a first protocol (e.g., LPDDR signaling), whereas the data bus interface 212 and the C/A bus interface 214 may support information communicated using a second protocol. Thus, the various bus interfaces coupled with the interface controller 202 may support different amounts of data or data rates.

The data bus interface 208 may be coupled with the data bus 260, the transactional bus 222, and the buffer circuitry 224. The data bus interface 208 may be configured to transmit and receive data over the data bus 260 and control information (e.g., acknowledgements/negative acknowledgements) or metadata over the transactional bus 222. The data bus interface 208 may also be configured to transfer data between the data bus 260 and the buffer circuitry 224. The data bus 260 and the transactional bus 222 may be coupled with the interface controller 202 and the host device such that a conductive path is established between the interface controller 202 and the host device. In some examples, the pins of the transactional bus 222 may be referred to as data mask inversion (DMI) pins. Although shown with one data bus 260 and one transactional bus 222, there may be any number of data buses 260 and any number of transactional buses 222 coupled with one or more data bus interfaces 208.

The C/A bus interface 210 may be coupled with the C/A bus 226 and the decoder 228. The C/A bus interface 210 may be configured to transmit and receive commands and addresses over the C/A bus 226. The commands and addresses received over the C/A bus 226 may be associated with data received or transmitted over the data bus 260. The C/A bus interface 210 may also be configured to transmit commands and addresses to the decoder 228 so that the decoder 228 can decode the commands and relay the decoded commands and associated addresses to the command circuitry 230.

The data bus interface 212 may be coupled with the data bus 232 and the memory interface circuitry 234. The data bus interface 212 may be configured to transmit and receive data over the data bus 232, which may be coupled with the non-volatile memory 206. The data bus interface 212 may also be configured to transfer data between the data bus 232 and the memory interface circuitry 234. The C/A bus interface 214 may be coupled with the C/A bus 236 and the memory interface circuitry 234. The C/A bus interface 214 may be configured to receive commands and addresses from the memory interface circuitry 234 and relay the commands and the addresses to the non-volatile memory 206 (e.g., to a local controller of the non-volatile memory 206) over the C/A bus 236. The commands and the addresses transmitted over the C/A bus 236 may be associated with data received or transmitted over the data bus 232. The data bus 232 and the C/A bus 236 may be coupled with the interface controller 202 and the non-volatile memory 206 such that conductive paths are established between the interface controller 202 and the non-volatile memory 206.

The data bus interface 216 may be coupled with the data buses 238 and the memory interface circuitry 240. The data bus interface 216 may be configured to transmit and receive data over the data buses 238, which may be coupled with the volatile memory 204. The data bus interface 216 may also be configured to transfer data between the data buses 238 and the memory interface circuitry 240. The C/A bus interface 264 may be coupled with the C/A bus 242 and the memory interface circuitry 240. The C/A bus interface 264 may be configured to receive commands and addresses from the memory interface circuitry 240 and relay the commands and the addresses to the volatile memory 204 (e.g., to a local controller of the volatile memory 204) over the C/A bus 242. The commands and addresses transmitted over the C/A bus 242 may be associated with data received or transmitted over the data buses 238. The data bus 238 and the C/A bus 242 may be coupled with the interface controller 202 and the volatile memory 204 such that conductive paths are established between the interface controller 202 and the volatile memory 204.

In addition to buses and bus interfaces for communicating with coupled devices, the interface controller 202 may include circuitry for operating the non-volatile memory 206 as a main memory and the volatile memory 204 as a cache. For example, the interface controller 202 may include command circuitry 230, buffer circuitry 224, cache management circuitry 244, one or more engines 246, and one or more schedulers 248.

The command circuitry 230 may be coupled with the buffer circuitry 224, the decoder 228, the cache management circuitry 244, and the schedulers 248, among other components. The command circuitry 230 may be configured to receive command and address information from the decoder 228 and store the command and address information in the queue 250. The command circuitry 230 may include logic 262 that processes command information (e.g., from a host device) and storage information from other components (e.g., the cache management circuitry 244, the buffer circuitry 224) and uses that information to generate one or more commands for the schedulers 248. The command circuitry 230 may also be configured to transfer address information (e.g., address bits) to the cache management circuitry 244. In some examples, the logic 26 2522 may be a circuit configured to operate as a finite state machine (FSM).

The buffer circuitry 224 may be coupled with the data bus interface 208, the command circuitry 230, the memory interface circuitry 234, and the memory interface circuitry 234. The buffer circuitry 224 may include a set of one or more buffer circuits for at least some banks, if not each bank, of the volatile memory 204. The buffer circuitry 224 may also include components (e.g., a memory controller) for accessing the buffer circuits. In one example, the volatile memory 204 may include sixteen banks and the buffer circuitry 224 may include sixteen sets of buffer circuits. Each set of the buffer circuits may be configured to store data from or for (or both) a respective bank of the volatile memory 204. As an example, the buffer circuit set for bank 0 (BK0) may be configured to store data from or for (or both) the first bank of the volatile memory 204 and the buffer circuit for bank 15 (BK15) may be configured to store data from or for (or both) the sixteenth bank of the volatile memory 204.

Each set of buffer circuits in the buffer circuitry 224 may include a pair of buffers. The pair of buffers may include one buffer (e.g., an open page data (OPD) buffer) configured to store data targeted by an access command (e.g., a storage command or retrieval command) from the host device and another buffer (e.g., a victim page data (VPD) buffer) configured to store data for an eviction process that results from the access command. For example, the buffer circuit set for BK0 may include the buffer 218 and the buffer 220, which may be examples of buffer 135-a and 135-b, respectively. The buffer 218 may be configured to store BK0 data that is targeted by an access command from the host device. And the buffer 220 may be configured to store data that is transferred from BK0 as part of an eviction process triggered by the access command. Each buffer in a buffer circuit set may be configured with a size (e.g., storage capacity) that corresponds to a page size of the volatile memory 204. For example, if the page size of the volatile memory 204 is 2 kB, the size of each buffer may be 2 kB. Thus, the size of the buffer may be equivalent to the page size of the volatile memory 204 in some examples.

The cache management circuitry 244 may be coupled with the command circuitry 230, the engines 246, and the schedulers 248, among other components. The cache management circuitry 244 may include a cache management circuit set for one or more banks (e.g., each bank) of volatile memory. As an example, the cache management circuitry 244 may include sixteen cache management circuit sets for BK0 through BK15. Each cache management circuit set may include two memory arrays that may be configured to store storage information for the volatile memory 204. As an example, the cache management circuit set for BK0 may include a memory array 252 (e.g., a CDRAM Tag Array (CDT-TA)) and a memory array 254 (e.g., a CDRAM Valid (CDT-V) array), which may be configured to store storage information for BK0. The memory arrays may also be referred to as arrays or buffers in some examples. In some cases, the memory arrays may be or include volatile memory cells, such as SRAM cells.

Storage information (or "metadata") may include content information, validity information, and/or dirty information (or any combination thereof) associated with the volatile memory 204, among other examples. Content information (which may also be referred to as tag information or address information) may indicate which data is stored in a set of volatile memory cells. For example, the content information (e.g., a tag address) for a row of the volatile memory 204 may indicate which set of one or more non-volatile memory cells currently has data stored in the row. As noted, validity information may indicate whether the data stored in a set of volatile memory cells is actual data (e.g., data having an intended order or form) or placeholder data (e.g., data being random or dummy, not having an intended or important order). And dirty information may indicate whether the data stored in a set of one or more volatile memory cells of the volatile memory 204 is different than corresponding data stored in a set of one or more non-volatile memory cells of the non-volatile memory 206. For example, dirty information may indicate whether data stored in a set of volatile memory cells has been updated relative to data stored in the non-volatile memory 206.

The memory array 252 may include memory cells that store storage information (e.g., tag information, validity information, dirty information) for an associated bank (e.g., BK0) of the volatile memory 204. The storage information may be stored on a per-row basis (e.g., there may be respective storage information for each row of the associated non-volatile memory bank). The interface controller 202 may check for requested data in the volatile memory 204 by referencing the storage information in the memory array 252. For instance, the interface controller 202 may receive, from a host device, a retrieval command for data in a set of non-volatile memory cells in the non-volatile memory 206. The interface controller 202 may use a set of one or more address bits (e.g., a set of row address bits) targeted by the access request to reference the storage information in the memory array 252. For instance, using set-associative mapping, the interface controller 202 may reference the content information in the memory array 252 to determine which set of volatile memory cells, if any, stores the requested data.

In addition to storing content information for volatile memory cells, the memory array 252 may also store validity information that indicates whether the data in a set of volatile memory cells is actual data (also referred to as valid data) or random data (also referred to as invalid data). For example, the volatile memory cells in the volatile memory 204 may initially store random data and continue to do so until the volatile memory cells are written with data from a host device or the non-volatile memory 206. To track which data is valid, the memory array 252 may be configured to set a bit for each set (e.g., row) of volatile memory cells when actual data is stored in that set of volatile memory cells. This bit may be referred to a validity bit or a validity flag. As with the content information, the validity information stored in the memory array 252 may be stored on a per-row basis. Thus, each validity bit may indicate the validity of data stored in an associated row in some examples.

In some examples, the memory array 252 may store dirty information that indicates whether a set (e.g., row) of volatile memory cells stores any dirty data. Like the validity information, the dirty information stored in the memory array 252 may be stored on a per-row basis.

The memory array 254 may be similar to the memory array 252 and may also include memory cells that store storage information for a bank (e.g., BK0) of the volatile memory 204 that is associated with the memory array 252. For example, the memory array 254 may store validity information and dirty information for a bank of the volatile memory 204. However, the storage information stored in the memory array 254 may be stored on a sub-block basis as opposed to a per-row basis. For example, the validity information stored in the memory cells of the memory array 254 may indicate the validity of data for subsets of volatile memory cells in a row of the volatile memory 204.

As an example, the validity information in the memory array 254 may indicate the validity of each subset (e.g., 32 B or 64 B) of data stored in row of BK0 of the volatile memory 204. Similarly, the dirty information stored in the memory cells of the memory array 254 may indicate which subsets of volatile memory cells in a row of the volatile memory 204 store dirty data. For instance, the dirty information in the memory array 254 may indicate the dirty status of each subset (e.g., 32 B or 64 B) of data stored in row of BK0 of the volatile memory 204. Storing storage information (e.g., tag information, validity information) on a per-row basis in the memory array 252 may allow the interface controller 202 to determine whether there is a hit or miss for data in the volatile memory 204. Storing storage information (e.g., validity information, dirty information) on a sub-block basis in the memory array 254 may allow the interface controller 202 to determine which subsets of data to return to the host device (e.g., during a retrieval process) and which subsets of data to preserve in the non-volatile memory 206 (e.g., during an eviction process).

Each cache management circuit set may also include a respective pair of registers coupled with the command circuitry 230, the engines 246, the memory interface circuitry 234, the memory interface circuitry 240, and the memory arrays for that cache management circuit set, among other components. For example, a cache management circuit set may include a first register (e.g., a register 256 which may be an open page tag (OPT) register) configured to receive storage information (e.g., one or more bits of tag information, validity information, and/or dirty information) from the memory array 252 or the scheduler 248-b or both. The cache management circuitry set may also include a second register (e.g., a register 258 which may be a victim page tag (VPT) register) configured to receive storage information (e.g., validity information and/or dirty information) from the memory array 254 and the scheduler 248-a or both. The information in the register 256 and the register 258 may be transferred to the command circuitry 230 and the engines 246 to enable decision-making by these components. For example, the command circuitry 230 may issue commands for reading the non-volatile memory 206 or the volatile memory 204 based on storage information in the register 256 and/or the register 258.

The engine 246-a may be coupled with the register 256, the register 258, and the schedulers 248. The engine 246-a may be configured to receive storage information from various components and issue commands to the schedulers 248 based on the storage information. For example, when the interface controller 202 is in a first mode such as a write-through mode, the engine 246-a may issue commands to the scheduler 248-b and in response the scheduler 248-b to initiate or facilitate the transfer of data from the buffer 218 to both the volatile memory 204 and the non-volatile memory 206. Alternatively, when the interface controller 202 is in a second mode such as a write-back mode, the engine 246-a may issue commands to the scheduler 248-b and in response the scheduler 248-b may initiate or facilitate the transfer of data from the buffer 218 to the volatile memory 204. In the event of a write-back operation, the data stored in the volatile memory 204 may eventually be transferred to the non-volatile memory 206 during a subsequent eviction process.

The engine 246-b may be coupled with the register 258 and the scheduler 248-a. The engine 246-b may be configured to receive storage information from the register 258 and issue commands to the scheduler 248-a based on the storage information. For instance, the engine 246-b may issue commands to the scheduler 248-a to initiate or facilitate transfer of dirty data from the buffer 220 to the non-volatile memory 206 (e.g., as part of an eviction process). If the buffer 220 holds a set of data transferred from the volatile memory 204 (e.g., victim data), the engine 246-b may indicate which one or more subsets (e.g., which 64 B) of the set of data in the buffer 220 should be transferred to the non-volatile memory 206.

The scheduler 248-a may be coupled with various components of the interface controller 202 and may facilitate accessing the non-volatile memory 206 by issuing commands to the memory interface circuitry 234. The commands issued by the scheduler 248-a may be based on commands from the command circuitry 230, the engine 246-a, the engine 246-b, or a combination of these components. Similarly, the scheduler 248-b may be coupled with various components of the interface controller 202 and may facilitate accessing the volatile memory 204 by issuing commands to the memory interface circuitry 240. The commands issued by the scheduler 248-b may be based on commands from the command circuitry 230 or the engine 246-a, or both.

The memory interface circuitry 234 may communicate with the non-volatile memory 206 via one or more of the data bus interface 212 and the C/A bus interface 214. For example, the memory interface circuitry 234 may prompt the C/A bus interface 214 to relay commands issued by the memory interface circuitry 234 over the C/A bus 236 to a local controller in the non-volatile memory 206. And the memory interface circuitry 234 may transmit to, or receive data from, the non-volatile memory 206 over the data bus 232. In some examples, the commands issued by the memory interface circuitry 234 may be supported by the non-volatile memory 206 but not the volatile memory 204 (e.g., the commands issued by the memory interface circuitry 234 may be different than the commands issued by the memory interface circuitry 240).

The memory interface circuitry 240 may communicate with the volatile memory 204 via one or more of the data bus interface 216 and the C/A bus interface 264. For example, the memory interface circuitry 240 may prompt the C/A bus interface 264 to relay commands issued by the memory interface circuitry 240 over the C/A bus 242 to a local controller of the volatile memory 204. And the memory interface circuitry 240 may transmit to, or receive data from, the volatile memory 204 over one or more data buses 238. In some examples, the commands issued by the memory interface circuitry 240 may be supported by the volatile memory 204 but not the non-volatile memory 206 (e.g., the commands issued by the memory interface circuitry 240 may be different than the commands issued by the memory interface circuitry 234).

Together, the components of the interface controller 202 may operate the non-volatile memory 206 as a main memory and the volatile memory 204 as a cache. Such operation may be prompted by one or more access commands (e.g., read/retrieval commands/requests and write/storage commands/requests) received from a host device.

In some examples, the interface controller 202 may receive a storage command from the host device. The storage command may be received over the C/A bus 226 and transferred to the command circuitry 230 via one or more of the C/A bus interface 210 and the decoder 228. The storage command may include or be accompanied by address bits that target a memory address of the non-volatile memory 206. The data to be stored may be received over the data bus 260 and transferred to the buffer 218 via the data bus interface 208. In a write-through mode, the interface controller 202 may transfer the data to both the non-volatile memory 206 and the volatile memory 204. In a write-back mode, the interface controller 202 may transfer the data to only the volatile memory 204.

In either mode, the interface controller 202 may first check to see if the volatile memory 204 has memory cells available to store the data. To do so, the command circuitry 230 may reference the memory array 252 (e.g., using a set of the memory address bits) to determine whether one or more of the n sets (e.g., row) of volatile memory cells associated with the memory address are empty (e.g., store random or invalid data). For example, the command circuitry 230 may determine whether one or more of the n sets (e.g., rows) of volatile memory cells is available based on tag information and validity information stored in the memory array 252. In some cases, a set of volatile memory cells in the volatile memory 204 may be referred to as a line, cache line, or row.

If one of the n associated sets of volatile memory cells is available for storing information, the interface controller 202 may transfer the data from the buffer 218 to the volatile memory 204 for storage in that set of volatile memory cells. But if no associated sets of volatile memory cells are empty, the interface controller 202 may initiate an eviction process to make room for the data in the volatile memory 204. The eviction process may involve transferring the victim data from one of the n associated sets of volatile memory cells to the buffer 220. The dirty information for the victim data may be transferred from the memory array 254 to the register 258 for identification of dirty subsets of the victim data. After the victim data is stored in the buffer 220, the new data can be transferred from the buffer 218 to the volatile memory 204 and the victim data can be transferred from the buffer 220 to the non-volatile memory 206. In some cases, dirty subsets of the old data are transferred to the non-volatile memory 206 and clean subsets (e.g., unmodified subsets) are discarded. The dirty subsets may be identified by the engine 246-$b$ based on dirty information transferred from the memory array 254 to the register 258 during the eviction process.

In another example, the interface controller 202 may receive a retrieval command from the host device. The retrieval command may be received over the C/A bus 226 and transferred to the command circuitry 230 via one or more of the C/A bus interface 210 and the decoder 228. The retrieval command may include address bits that target a memory address of the non-volatile memory 206. Before attempting to access the targeted memory address of the non-volatile memory 206, the interface controller 202 may check to see if the volatile memory 204 stores the data. To do so, the command circuitry 230 may reference the memory array 252 (e.g., using a set of the memory address bits) to determine whether one or more of the n sets (e.g., rows) of volatile memory cells associated with the memory address stores the requested data. If the requested data is stored in the volatile memory 204, the interface controller 202 may transfer the requested data to the buffer 218 for transmission to the host device over the data bus 260.

If the requested data is not stored in the volatile memory 204, the interface controller 202 may retrieve the data from the non-volatile memory 206 and transfer the data to the buffer 218 for transmission to the host device over the data bus 260. Additionally, the interface controller 202 may transfer the requested data from the buffer 218 to the volatile memory 204 so that the data can be accessed with a lower latency during a subsequent retrieval operation. Before transferring the requested data, however, the interface controller 202 may first determine whether one or more of the n associated sets of volatile memory cells is available to store the requested data. The interface controller 202 may determine the availability of the n associated sets of volatile memory cells by communicating with the related cache management circuit set. If an associated set of volatile memory cells is available, the interface controller 202 may transfer the data in the buffer 218 to the volatile memory 204 without performing an eviction process. Otherwise, the interface controller 202 may transfer the data from the buffer 218 to the volatile memory 204 after performing an eviction process.

The memory subsystem 200 may be implemented in one or more configurations, including one-chip versions and multi-chip versions. A multi-chip version may include one or more constituents of the memory subsystem 200, including the interface controller 202, the volatile memory 204, and the non-volatile memory 206 (among other constituents or combinations of constituents), on a chip that is separate from a chip that includes one or more other constituents of the memory subsystem 200. For example, in one multi-chip version, respective separate chips may include each of the interface controller 202, the volatile memory 204, and the non-volatile memory 206. In contrast, a one-chip version may include the interface controller 202, the volatile memory 204, and the non-volatile memory 206 on a single chip.

As noted, the memory subsystem 200 may store different types of metadata in different memories of the memory subsystem 200. For example, the memory subsystem 200 may store tag information, validity information, and dirty information for a row of the volatile memory 204 in the memory array 252. And the memory subsystem 200 may store validity information and dirty information for sub-blocks of a row in the memory array 254. Rather than accessing the memory arrays 252, 254 multiple times to service access commands, the memory subsystem 200 may be configured to strategically transfer the storage information in the memory arrays 252, 254 to the registers 256, 258 so that the registers 256, 258 are accessed instead of the memory array 252, 254. Because the registers 256, 258 are easier and quicker to access than the memory arrays 252, 254, such a technique may reduce the complexity and latency associating with referencing the storage information to service access commands, among other advantages.

Figure 3:
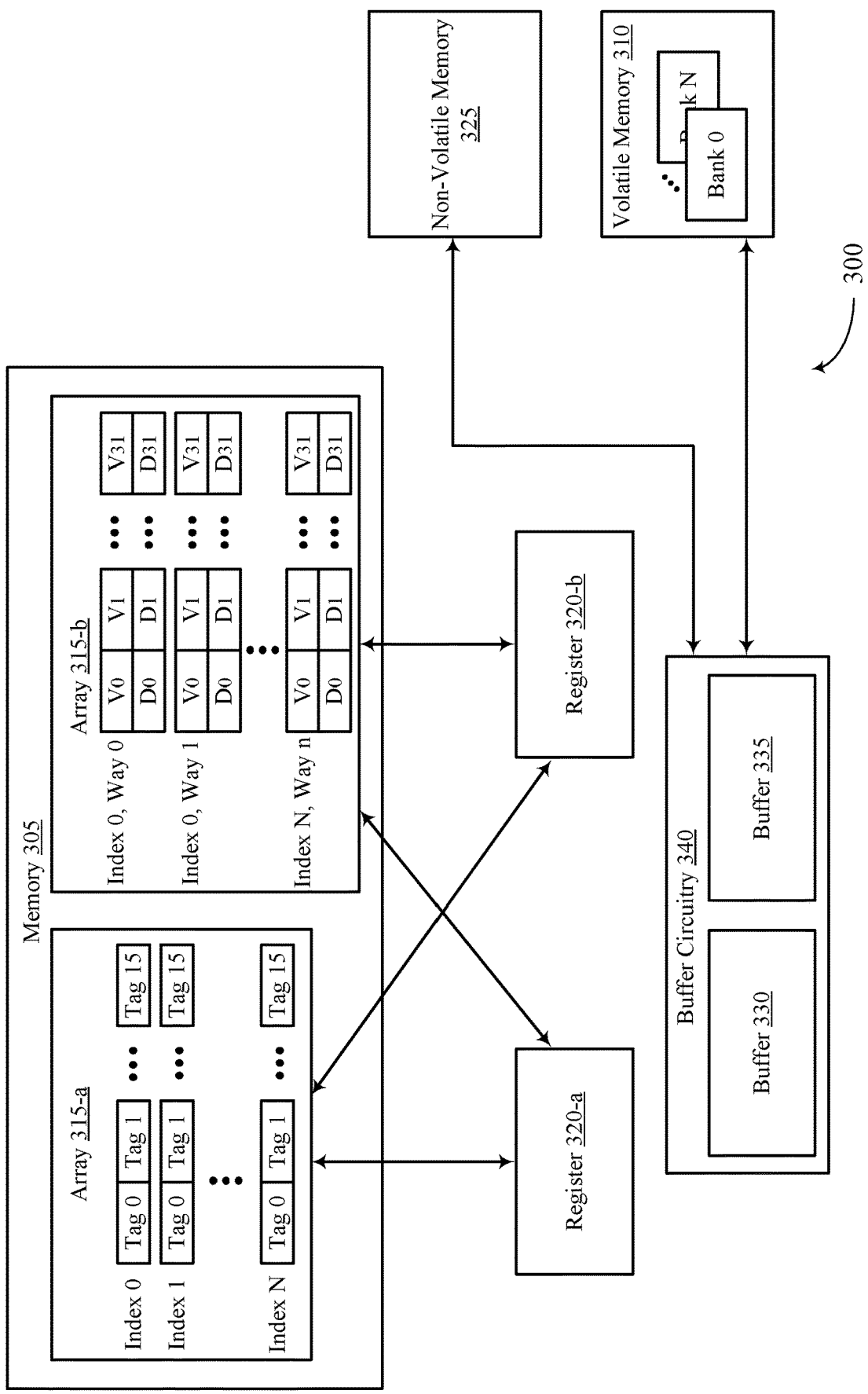
FIG. 3 illustrates an example of a device that supports metadata management for a cache in accordance with examples as disclosed herein.

FIG. 3 illustrates an example of a device 300 that supports metadata management for a cache in accordance with examples as disclosed herein. The device 300 may be an example of the memory subsystem 110 or the memory subsystem 200 described with reference to FIGS. 1 and 2, respectively. The device 300 may strategically communicate metadata (also referred to as "storage information") stored in the arrays 315 to the registers 320 to reduce the amount of time it takes to reference the metadata to service access commands, among other advantages.

As an example, the device 300 may reference storage information (e.g., tag information, validity information) in the register 320-a to determine whether there is a cache hit or miss, and thus, whether to access the volatile memory 310 or the non-volatile memory 325. The device 300 may reference storage information (e.g., dirty information) in the register 320-b to identify dirty data that should be moved to the non-volatile memory 325 during an eviction process. And the device 300 may reference validity information in the register 320-a to identify valid data that should be returned to a host device during a retrieval process.

Although the functionality described herein may be attributed to various components for illustration, it should be appreciated that some functionality described herein may be distributed, or shared between components, or attributed to components other than in the manner described.

The array 315-a may be an example of the memory array 252 and the register 320-a may be an example of the register 256. Similarly, the array 315-b may be an example of the memory array 254 and the register 320-b may be an example of the register 258. The array 315-a and the array 315-b may be arrays or sub-arrays in the memory 305. In some examples, the array 315-a, the array 315-b, the register 320-a, and the register 320-b may be dedicated to a common bank (e.g., bank x) of the volatile memory 310, which may include multiple banks (denoted bank 0 through bank N).

As a threshold matter, it should be appreciated that the volatile memory 310 and the non-volatile memory 325 may have certain protocols to be followed for accessing memory cells. For example, before performing a read operation or a write operation on a row in either memory, the device 300 may activate (or "open") the row by applying a voltage to the access line for the row. And in some examples, the device 300 may deactivate (or "close") an activated row in a bank before activating a different row in the same bank. The strategic movement of metadata from the arrays to the registers described herein may facilitate, and be based on, the access protocols for the memories. For example, upon receipt of an activate command for a row of the volatile memory 310, the device 300 may activate that row and communicate the storage information for that row from the array 315-a to the register 320-a in anticipation of a subsequent access command (e.g., a read command or a write command) for that row.

The array 315-a may store metadata for a bank (e.g., bank x) of the volatile memory 310. For example, if the volatile memory 310 uses a set-associative addressing scheme, the array 315-a may store tag information for each set of volatile memory rows. Each set of volatile memory rows may be identified by a respective index and, in an n-way set associative addressing scheme, may include n volatile memory rows that are permitted to store data from a particular memory address of the non-volatile memory 325 ("non-volatile memory address"). For example, the set of volatile memory rows permitted to store data for a non-volatile memory address y may be indicated by index 0 and, in a 16-way set-associative addressing scheme, may include sixteen volatile memory rows. Similarly, the set of volatile memory rows permitted to store data for a non-volatile memory address z may be indicated by index 1 and, in a 16-way set-associative addressing scheme, may include sixteen volatile memory rows. Continuing the example, data from non-volatile memory address y is permitted to be stored in any of the rows in the set for index 0, whereas data from non-volatile memory address z is permitted to be stored in any of the rows in the set for index 1. Thus, the volatile memory rows in a set may be referred to as being "associated with" a non-volatile memory address. Each volatile memory row in a set may be identified by a "way identifier" (Way ID), which, in a 16-way set-associative addressing scheme, may be made up of four bits.

For each volatile memory row in a set, the array 315-a may store tag information for that volatile memory row. The tag information for a row may identify the non-volatile memory address associated with the data stored in the row. Thus, the device 300 may determine whether there is a cache hit or miss for an access command by referencing the tag information for the volatile memory rows associated with the access command. For example, if the device 300 receives an access command associated with the set of volatile memory rows identified by index 0, the device 300 may determine whether there is a cache hit by referencing the tag information for the sixteen volatile memory rows in that set. That is, the device 300 may reference, for example, Tag 0 through Tag 15 to determine whether any of the sixteen volatile memory rows in the set store data for the non-volatile memory address associated with the access command.

It should be appreciated that in some examples, the non-volatile address associated with an access command may be based on a logical address associated with the access command. A logical address may be a virtual address generated by a host device and used to reference a conceptual location where data is expected to be stored, whereas a physical address may be an actual address that identifies a physical location where data is actually stored. Logical addresses may be used by a host device so that the effects of various procedures (e.g., wear-leveling procedures) are effectively hidden from the host device, among other reasons. However, because the device 300 operates on physical addresses, logical addresses may be mapped to physical addresses to facilitate communications between the host device and the device 300. For example, the logical address of an access command may be mapped to a physical address based on an offset pointer, which may be a collection of bits that indicate the offset (e.g., difference) between the logical address and the physical address. Such mapping may be referred to herein as translation or conversion.

In addition to storing tag information for each volatile memory row, the array 315-a may also store a validity bit and a dirty bit for each volatile memory row. Thus, the device 300 may determine whether a volatile memory row stores valid data and/or dirty data by referencing the validity bit and dirty bit, respectively, for that volatile memory row.

As described herein, the metadata for a volatile memory row may be communicated from the array 315-a to the register 320-a when the device 300 receives an activate command from a host device. If one of the volatile memory rows stores data from the non-volatile memory address associated with the activate command, the device 300 may communicate the metadata for that volatile memory row to the register 320-a. If none of the volatile memory rows store data from the non-volatile memory address associated with the activate command, the device 300 may communicate the metadata for an empty volatile memory row—if one exists—to the register 320-a; otherwise, the device 300 may communicate the metadata for a full volatile memory row to the register 320-a. An empty (or "available") volatile memory row (e.g., a row that stores random or garbage data) may be preferred over a full (or "unavailable") volatile memory row (e.g., a row that stores valid, actual data)

because an empty volatile memory row allows the device 300 to avoid an eviction process—which may consume time and resources—before transferring requested data from the non-volatile memory 325 to the volatile memory 310 in the event of a cache miss.

In addition to communicating the metadata for a volatile memory row from the array 315-*a* to the register 320-*a*, the device 300 may activate the volatile memory row in the volatile memory 310. Although the device 300 may not yet know whether there is a cache hit or miss (because a read or write command may not have been received), the device 300 may nevertheless activate the volatile memory row because the volatile memory row may be accessed in some manner (either to read or write) regardless of the cache hit or miss.

When a subsequent read command or write command for the volatile memory row is received at the device 300, the device 300 may access the register 320-*a*, rather than the array 315-*a*, to determine a cache hit or miss. Because the register 320-*a* is faster to access than the array 315-*a*, the device 300 may reduce latency by accessing the register 320-*a* for the metadata information rather than accessing the array 315-*a*. Using the tag information (and validity information) in the register 320-*a*, the device 300 determine whether there is a read hit, a write miss, a write hit, or a write miss. Based on the outcome of this determination, the device 300 may take different approaches as described herein and with reference to FIGS. 4 and 5.

Like the array 315-*a*, the array 315-*b* may also store metadata for a bank (e.g., bank x) of the volatile memory 310. However, rather than storing metadata on a per-row basis (like the array 315-*a*) the array 315-*b* may store metadata on a different basis, such as a sub-block basis. For example, the array 315-*b* may store a validity bit for each 32 B (or 64 B, etc.) of data in a row of the volatile memory 310. Additionally or alternatively, the array 315-*b* may store a dirty bit for each 32 B (or 64 B, etc.) of data in a row of the volatile memory 310. As an example, the array 315-*b* may store thirty-two (32) validity bits (denoted $V_0$ through $V_{31}$) for the row associated with way 0 in the set indicated by index 0. Additionally or alternatively, the array 315-*b* may store thirty-two (32) dirty bits (denoted $D_0$ through $D_{31}$) for the row associated with Way 0 in the set indicated by index 0. And so on and so for each row in each set of volatile memory rows.

As described herein, the metadata for a volatile memory row may be communicated from the array 315-*b* to the register 320-*a* or the register 320-*b* when the device 300 determines a cache hit or miss. For example, if there is a read hit, the device 300 may communicate the validity information for that volatile memory row to the register 320-*a*. This way, the device 300 may reference the validity information in the register 320-*a* to determine which sub-blocks of data are valid and should be returned to the host device. If there is a read miss, the device 300 may communicate the dirty information for a victim volatile memory row to the register 320-*b*. This way, the device 300 may reference the dirty information in the register 320-*b* to determine which sub-blocks of data are dirty and should be saved to the non-volatile memory 325 (e.g., during an eviction process).

A cache hit may refer to a read hit or a write hit. A read hit may occur when data requested by the host device is stored in one of the rows of the volatile memory 310. The device may determine a read hit based on the tag information for the set of volatile memory rows associated with the non-volatile address for the read command. A write hit may occur when one of the rows of the volatile memory 310 stores data from the non-volatile address associated with a write command. The device 300 may determine a write hit based on the tag information for the set of volatile memory rows associated with the non-volatile address indicated by the write command.

In the event of a read hit, the device 300 may read the requested data from the hit row of the volatile memory 310 and communicate the requested data from the volatile memory 310 to the buffer 330. The buffer 330 may be an example of the buffer 218 described with reference to FIG. 2. Thus, the buffer 330 may be configured to relay or communicate requested data to the host device. However, only some of the data in a row of the volatile memory 310 may be valid data. To prevent communication of invalid data to the host device, the device 300 may reference the validity information in the register 320-*a* to determine which sub-blocks of data are valid and thus should be returned to the host device. As noted, the validity information in the register 320-*a* may include validity information for the hit row from the array 315-*b*.

In the event of a write hit, the device 300 may write the data associated with the write command (e.g., data provided by the host device) to the hit row of the volatile memory 310. The provided data may be communicated to the volatile memory 310 from the buffer 330. As noted, the buffer 330 may be an example of the buffer 218 described with reference to FIG. 2. Thus, the buffer 330 may be configured to relay or communicate data from the host device to the volatile memory 310. If the device 300 is operating in write-back mode, the device 300 may refrain from writing the provided data to the non-volatile memory 325 (at least until a later eviction process). So, to prepare for a later eviction process, the device 300 may update the dirty information in the register 320-*a* to indicate the portions of the hit row that now store dirty data. As noted, the dirty information in the register 320-*a* may include dirty information for the hit row from the array 315-*b*.

A cache miss may refer to a read miss or a write miss. A read miss may occur when data requested by the host device is absent from the volatile memory 310. The device may determine a read miss based on the tag information for the set of volatile memory rows associated with the non-volatile address for the read command. A write miss may occur when the volatile memory 310 does not store data from the non-volatile address associated with a write command. The device 300 may determine a write miss based on the tag information for the set of volatile memory rows associated with the non-volatile address indicated by the write command.

In the event of a read miss, the device 300 may communicate the requested data from the non-volatile memory 325 to the buffer 330 so that the requested data can be relayed to the host device and the volatile memory 310. This way, the read command can be satisfied and the requested data can be written to the volatile memory 310 for efficient retrieval in the event of a subsequent read command for the requested data. Unless the volatile memory 310 has an empty row available for the requested data, the volatile memory may perform an eviction process before writing the requested data to the volatile memory 310. The eviction process may save dirty data from the volatile memory 310 to the non-volatile memory 325 so that the dirty data is not lost when the requested data is written to the volatile memory row. The volatile memory row subject to the eviction process may be referred to as the victim row, and the data in the victim row may be referred to as victim data.

To perform an eviction process, the device 300 may communicate victim data from a victim row to the buffer 335, then communicate dirty victim data from the buffer 335 to the non-volatile memory 325. The buffer 335 may be an example of a buffer 220 described with reference to FIG. 2. The device may reference dirty information for the volatile memory row in the register 320-b to determine which subsets of victim data are dirty and thus should be written back to the non-volatile memory 325. As noted, the dirty information in the register 320-b may include dirty information for the victim row from the array 315-b. Additionally, it should be appreciated that the buffer 330 and the buffer 335 may be included in, or part of, buffer circuitry 340, which may be coupled with the non-volatile memory 325 and the volatile memory 310. The buffer circuitry 340 may be an example of a buffer circuit set described with reference to FIG. 2 and may include various components for communicating, storing, and retrieving data.

In the event of a write miss, the device 300 may write the data associated with the write command (e.g., data provided by the host device) to one of the rows in the set of volatile memory rows associated with the non-volatile memory address. The provided data may be communicated to the volatile memory 310 from the buffer 330. As noted, the buffer 330 may be an example of the buffer 218 described with reference to FIG. 2. Thus, the buffer 330 may be configured to relay or communicate data from the host device to the volatile memory 310. Before writing the provided data to the volatile memory row, the device 300 may perform an eviction process for the volatile memory row (e.g., if the volatile memory row is full) using the buffer 335.

Upon writing the provided data to the volatile memory row, the device 300 may update the tag information for the volatile memory row in the register 320-a so that the non-volatile memory address associated with the write command is indicated. If the device 300 is operating in write-back mode, the device 300 may refrain from writing the provided data to the non-volatile memory 325 (at least until a later eviction process). So, to prepare for a later eviction process, the device 300 may update the dirty information in the register 320-a to indicate the portions of the hit row that now store dirty data. As noted, the dirty information in the register 320-a may include dirty information for the hit row from the array 315-b.

Thus, the device 300 may strategically communicate metadata from the arrays 315 to the registers 320 to efficiently service access commands from a host device.

Figure 4:
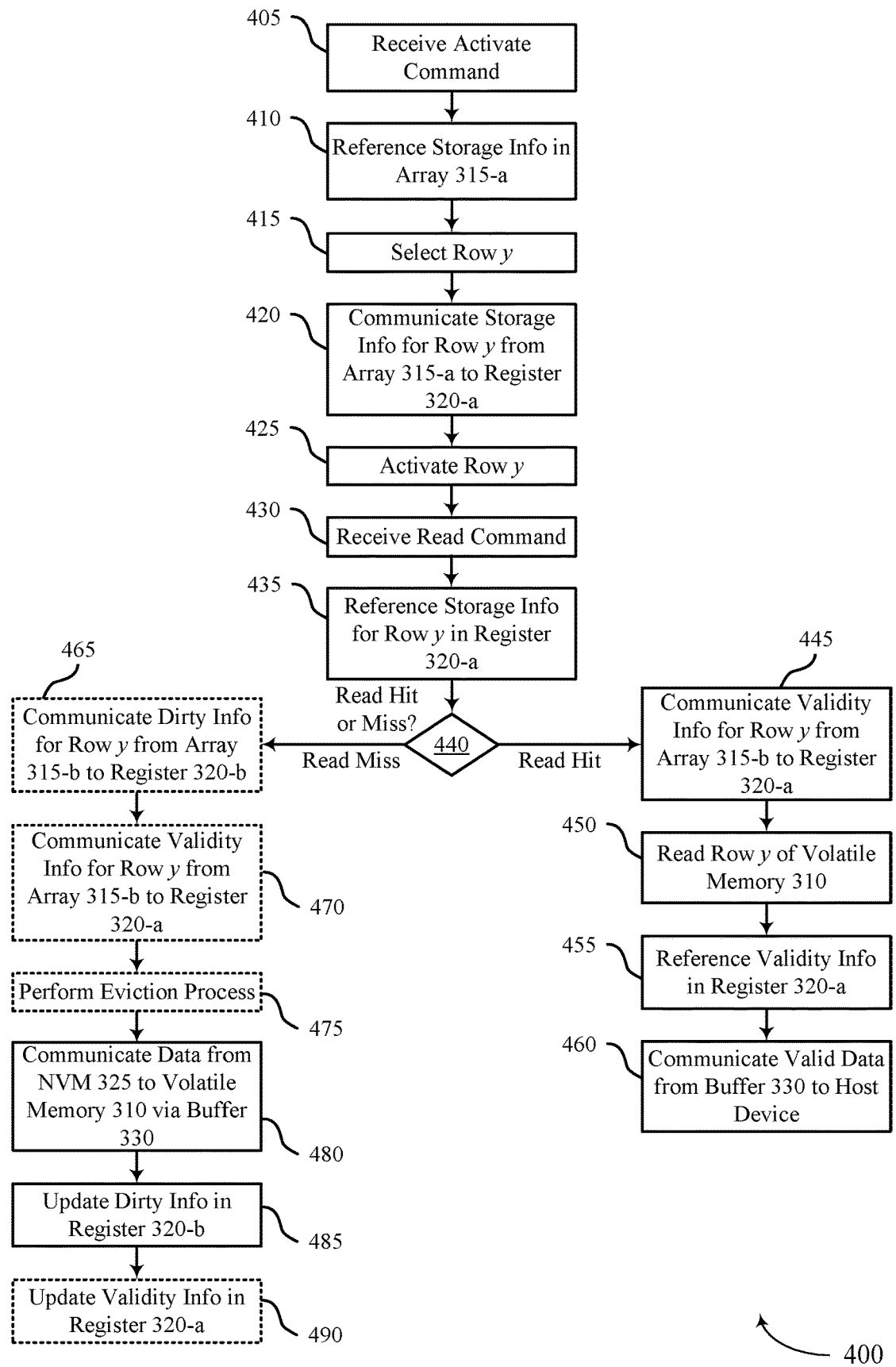
FIG. 4 illustrates an example of a process flow that supports metadata management for a cache in accordance with examples as disclosed herein.

FIG. 4 illustrates an example of a process flow 400 that supports metadata management for a cache in accordance with examples as disclosed herein. Process flow 400 may be an example of a process flow for a retrieval operation, which may include servicing an activate command and a read command. Process flow 400 may be implemented by an interface controller 115 as described with reference to FIG. 1, an interface controller 202 as described with reference to FIG. 2, or a device 300 as described with reference to FIG. 3.

For ease of reference, the process flow 400 is described with reference to the device 300. So, aspects of the process flow 400 may be implemented by a controller, among other components. Additionally or alternatively, aspects of the process flow 400 may be implemented as instructions stored in memory (e.g., firmware stored in the volatile memory 120 and/or the non-volatile memory 125). For example, the instructions, when executed by a controller (e.g., the interface controller 115), may cause the controller to perform the operations of the process flow 400.

Alternative examples of the process flow 400 may be implemented in which some operations are performed in a different order than described or are not performed at all. In some cases, operations may include features not mentioned below, or additional operations may be added.

At 405, an activate command may be received. For example, the device 300 may receive from a host device an activate command associated with a non-volatile memory address. If the device 300 uses a set-associative cache addressing scheme, the non-volatile memory address may be associated with a set of volatile memory rows (e.g., n volatile memory rows). At 410, storage information for the set of volatile memory rows may be referenced. For example, the device 300 may use the array 315-a to reference storage information for the set of volatile memory rows associated with the non-volatile memory address. The storage information may be referenced to determine which volatile memory row should be activated in preparation for a subsequent access command (and thus, which storage information to communicate to a register for efficient reference when the subsequent access command is received).

At 415, a volatile memory row may be selected. For example, the device 300 may select a volatile memory row (e.g., row y) based on the storage information for the set of volatile memory rows. If the storage information (e.g., tag information, validity information) indicates that row y stores data from the non-volatile memory address associated with the access command, the device may select row y based on that condition. If the storage information (e.g., tag information, validity information) indicates that no row associated with the non-volatile memory address stores data from the non-volatile memory address, row y may be selected based on one or more factors. For example, the device 300 may prioritize row y for selection over other rows in the set based on the storage status of row y (with an empty row being preferred over a full row, to avoid an eviction process), the frequency of access for row y relative to other rows in the set, and/or the age of row y relative to other rows in the set, among other factors.

At 420, storage information for row y may be communicated from an array to a register. For example, the device 300 may communicate storage information for row y from the array 315-a to the register 320-a. The storage information may include tag information for row y, a validity bit for row y, and/or a dirty bit for row y, among other information.

At 425, row y may be activated. For example, the device 300 may activate row y in the volatile memory 310. The activation of row y may be in response to the activate command received at 405 and/or based on communicating the storage information for row y from the array 315-a to the register 320-a. Row y may be activated before a subsequent read or write command is received because row y may be accessed regardless of the command type received (e.g., row y may be accessed to read requested data in the event of a read hit, to write data as part of a fill process in the event of a read miss, to write data in the event of a write hit, or to write data as part of a fill process in the event of a write miss). A fill process may refer to a process of storing data from the non-volatile memory 325 in the volatile memory 310 so that the data can be accessed from the volatile memory 310 in response to a later request for the data.

At 430, a read command may be received. For example, the device 300 may receive a read command associated with the non-volatile memory address targeted by the activate command. At 435, the storage information for row y may be referenced. For example, the device 300 may reference the storage information for row y in the register 320-a. At 440, a read hit or miss is determined. For example, the device 300 may determine, based on the storage information for row y in the register 320-*a*, whether there is a read hit or a read miss.

If, at 440, a read hit is determined, validity information for row y may be communicated from a second array to the first register at 445. For example, if, at 440, the device 300 determines that there is a read hit (e.g., row y stores the requested data), the device 300 may, at 445, communicate validity information for row y from the array 315-*b* to the register 320-*a*. At 450, data in row y may be read and communicated to an intermediary buffer. For example, the device 300 may read data from row y and communicate it to the buffer 330. At 455, the validity information for row y may be referenced. For example, the device 300 may reference the validity information for row y in the register 320-*a* to determine which memory cells in row y store valid data. At 460, valid data from row y may be communicated from the intermediary buffer to the host device. For example, the device 300 may, based on the validity information in the register 320-*a*, communicate valid data from the buffer 330 to the host device. Thus, the device 300 may satisfy the read command from the host device.

If, at 440, a read miss is determined, dirty information for row y may be communicated from the second array to the second register at 465. For example, if, at 440, the device 300 determines that there is a read miss (e.g., row y does not store the requested data), the device 300 may, at 465, communicate dirty information for row y from the array 315-*b* to the register 320-*b*. The device 300 may reference the validity bit and dirty bit for row y in the register 320-*a* to determine whether to perform the operations at 465. For example, the device 300 may skip the operations at 465 if the validity bit and the dirty bit for row y indicate either 1) that row y stores invalid (e.g., garbage) data or 2) row y stores clean valid data, because in such scenarios no eviction process is needed to prepare row y for a fill process. That is, the data in row y can be overwritten without first saving it to the non-volatile memory 325. Alternatively, the device 300 may perform the operations at 465 if the validity bit and the dirty bit for row y indicate that row y stores dirty valid data, because in such a scenario an eviction process is needed to save the data in row y to the non-volatile memory before the data in row y is overwritten during a subsequent fill process. In some examples, the device 300 may also, at 470, communicate validity information for row y from the array 315-*b* to one or more of the register 320-*a* or register 320-*b*.

At 475, an eviction process may be performed for row y. For example, the device 300 may perform an eviction process for row y to make room for the requested data from the non-volatile memory 325. As noted, the eviction process may be performed if row y stores invalid data or clean valid data and may be skipped if row y stores dirty valid data. The eviction process may include communicating data stored in row y from the volatile memory 310 to the buffer 335, referencing the dirty information for row y in the register 320-*b* to determine dirty data, and communicating the dirty data from the buffer 335 to the non-volatile memory 325 based on the dirty information for row y.

At 480, data from the non-volatile memory may be communicated to the volatile memory via an intermediary buffer. For example, the device 300 may communicate (e.g., as part of a fill process) the requested data from the non-volatile memory 325 to the volatile memory 310 via the buffer 330. For example, the requested data may be communicated from the non-volatile memory 325 to the buffer 330, then from the buffer 330 to the volatile memory 310. By storing the requested data in the volatile memory 310—which has a faster access time than the non-volatile memory 325—the memory device may access the data more quickly in the event that the host device requests the data again. Additionally, the requested data may be communicated from the buffer 330 to the host device so that the read command is satisfied.

At 485, the dirty information in the second register may be updated. For example, the device 300 may update the dirty information for row y in the register 320-*b* to reflect the dirty status of data in row y after the fill process. For example, the device 300 may update the dirty information for row y to reflect that no portions of row y store dirty data because row y stores the same data as the associated non-volatile memory address (due to the fill process). After updating the dirty information for row y in the register 320-*b*, the device 300 may communicate the dirty information for row y to the array 315-*b* so that the register 320-*b* is available for use in a subsequent eviction process.

In some examples, the device 300 may, at 490, update the validity information for row y in the register 320-*a* to reflect any changes to the validity status of data in row y after the fill process. After updating the validity information for row y in the register 320-*a*, the device 300 may communicate the validity information for row y to the array 315-*b* so that the register 320-*a* is available for use in a subsequent access process.

Figure 5:
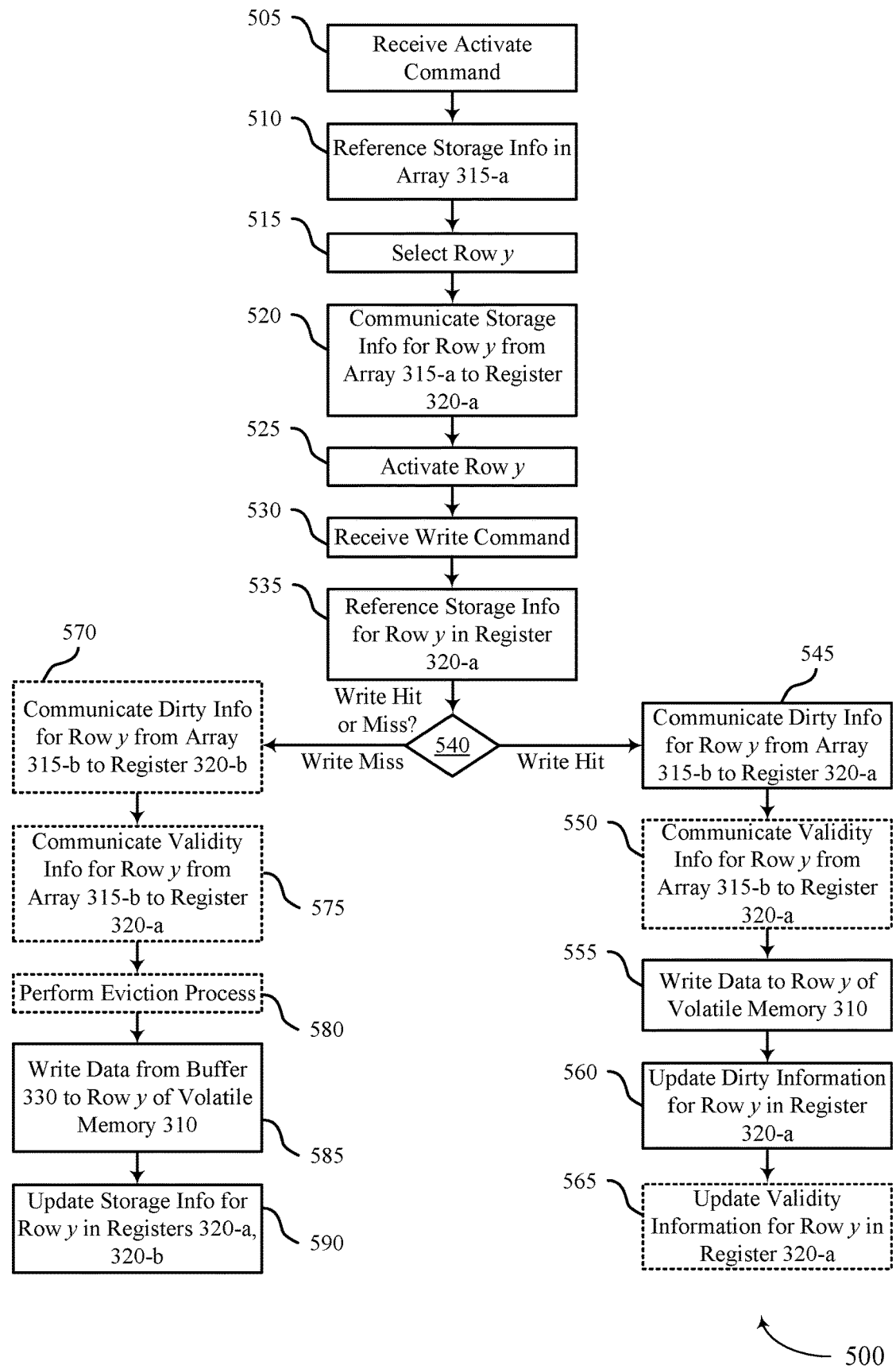
FIG. 5 illustrates an example of a process flow that supports metadata management for a cache in accordance with examples as disclosed herein.

FIG. 5 illustrates an example of a process flow 500 that supports metadata management for a cache in accordance with examples as disclosed herein. Process flow 500 may be an example of a process flow for a storage operation, which may include servicing an activate command and a write command. Process flow 500 may be implemented by an interface controller 115 as described with reference to FIG. 1, an interface controller 202 as described with reference to FIG. 2, or a device 300 as described with reference to FIG. 3.

For ease of reference, the process flow 500 is described with reference to the device 300. So, aspects of the process flow 500 may be implemented by a controller, among other components. Additionally or alternatively, aspects of the process flow 500 may be implemented as instructions stored in memory (e.g., firmware stored in the volatile memory 120 and/or the non-volatile memory 125). For example, the instructions, when executed by a controller (e.g., the interface controller 115), may cause the controller to perform the operations of the process flow 500.

Alternative examples of the process flow 500 may be implemented in which some operations are performed in a different order than described or are not performed at all. In some cases, operations may include features not mentioned below, or additional operations may be added.

At 505, an activate command may be received. For example, the device 300 may receive from a host device an activate command associated with a non-volatile memory address. If the device 300 uses a set-associative cache addressing scheme, the non-volatile memory address may be associated with a set of volatile memory rows (e.g., n volatile memory rows). At 510, storage information for the set of volatile memory rows may be referenced. For example, the device 300 may use the array 315-*a* to reference storage information for the set of volatile memory rows associated with the non-volatile memory address. The storage information may be referenced to determine which volatile memory row should be activated in preparation for a subsequent access command (and thus, which storage information to communicate to a register for efficient reference when the subsequent access command is received).

At 515, a volatile memory row may be selected. For example, the device 300 may select a volatile memory row (e.g., row y) based on the storage information for the set of volatile memory rows. If the storage information (e.g., tag information, validity information) indicates that row y stores data from the non-volatile memory address associated with the access command, the device may select row y based on that condition. If the storage information (e.g., tag information, validity information) indicates that no row in the set stores data from the non-volatile memory address, row y may be selected based on one or more factors. For example, the device 300 may prioritize row y for selection over other rows in the set based on the storage status of row y (with an empty row being preferred over a full row, to avoid an eviction process), the frequency of access for row y relative to other rows in the set, and/or the age of row y relative to other rows in the set.

At 520, storage information for row y may be communicated from an array to a register. For example, the device 300 may communicate storage information for row y from the array 315-*a* to the register 320-*a*. The storage information may include tag information for row y, a validity bit for row y, and/or a dirty bit for row y, among other information.

At 525, row y may be activated. For example, the device 300 may activate row y in the volatile memory 310. The activation of row y may be in response to the activate command received at 405 and/or based on communicating the storage information for row y from the array 315-*a* to the register 320-*a*. Row y may be activated before a subsequent read or write command because row y will be accessed regardless of the command type received (e.g., either to read requested data in the event of a read hit, to write data as part of a fill process in the event of a read miss, to write data in the event of a write hit, or to write data as part of a fill process in the event of a write miss). As noted, a fill process may refer to a process of storing data from the non-volatile memory 325 in the volatile memory 310 so that the data can be accessed from the volatile memory 310 in response to a later request for the data.

At 530, a write command may be received. For example, the device 300 may receive a write command associated with the non-volatile memory address targeted by the activate command. At 535, the storage information for row y may be referenced. For example. the device 300 may reference the storage information for row y in the register 320-*a*. At 540, a write hit or miss is determined. For example, the device 300 may determine, based on the storage information for row y in the register 320-*a*, whether there is a write hit or a write miss.

If, at 540, a write hit is determined, dirty information for row y may be communicated from a second array to the register at 545. For example, if, at 540, the device 300 determines that there is a write hit (e.g., row y stores data from the non-volatile memory address targeted by the write command), the device 300 may, at 545, communicate dirty information for row y from the array 315-*b* to the register 320-*a* so that the dirty information for row y can be easily updated to reflect any changes when the provided data is written to row y. At 550, validity information for row y may be communicated from the second array to the first register. For example, the device 300 may communicate validity information for row y from the array 315-*b* to the register 320-*a* so that the validity information for row y can be easily updated to reflect any changes when the data provided by the host device is written to row y.

At 555, data provided by the host device may be written to (e.g., stored in) row y. For example, the device 300 may write the provided data to row y in the volatile memory 310. To do so, the device 300 may communicate the provided data from the buffer 330 to the volatile memory 310. Thus, the device 300 may satisfy the write command from the host device.

At 560, dirty information for row y may be updated. For example, the device 300 may update the dirty information for row y in the register 320-*b* to reflect the dirty status of data in row y after writing the provided data to row y. For example, the device 300 may update the dirty information for row y to reflect that the portions of row y that now store dirty data. After updating the dirty information for row y in the register 320-*a*, the device 300 may communicate the dirty information for row y to the array 315-*b* so that the register 320-*a* is available for use in a subsequent access process.

In some examples, the device 300 may, at 565, update the validity information for row y in the register 320-*a* to reflect any changes to the validity status of data in row y after writing the provided data to row y. After updating the validity information for row y in the register 320-*a*, the device 300 may communicate the validity information for row y to the array 315-*b* so that the register 320-*a* is available for use in a subsequent access process.

If, at 540, a write miss is determined, dirty information for row y may be communicated from the second array to the second register at 570. For example, if, at 540, the device 300 determines that there is a write miss (e.g., row y does not store data from the non-volatile memory address targeted by the write command), the device 300 may, at 570, communicate dirty information for row y from the array 315-*b* to the register 320-*b*. The device 300 may reference the validity bit and dirty bit for row y in the register 320-*a* to determine whether to perform the operations at 570. For example, the device 300 may skip the operations at 570 if the validity bit and the dirty bit for row y indicate either 1) that row y stores invalid (e.g., garbage) data or 2) row y stores clean valid data, because in such scenarios no eviction process is needed to prepare row y for the write process. That is, the old data in row y can be overwritten with the provided data without first saving the old data to the non-volatile memory 325. The device 300 may perform the operations at 570 if the validity bit and the dirty bit for row y indicate that row y stores dirty valid data, because in such a scenario an eviction process is needed to save the data in row y to the non-volatile memory before the data in row y is overwritten with the provided data. In some examples, the device 300 may also, at 575, communicate validity information for row y from the array 315-*b* to one or more of the register 320-*a* or register 320-*b*.

At 580, an eviction process may be performed for row y. For example, the device 300 may perform an eviction process for row y to make room for the provided data. As noted, the eviction process may be skipped if row y stores invalid data or clean valid data and may be performed if row y stores dirty valid data. The eviction process may include communicating data stored in row y from the volatile memory 310 to the buffer 335, referencing the dirty information for row y in the register 320-*b* to determine dirty data, and communicating the dirty data from the buffer 335 to the non-volatile memory 325 based on the dirty information for row y.

At 585, data provided by the host device may be written to row y. For example, the device 300 may write the provided data to row y in the volatile memory 310. To do so, the device 300 may communicate the provided data from the buffer 330 to the volatile memory 310. Thus, the device 300 may satisfy the write command from the host device.

At 590, storage information for row y may be updated. For example, the device 300 may update the storage information for row y in the registers 320-*a*, 320-*b*. For instance, the device 300 may update the tag information for row y in the register 320-*a* to reflect the non-volatile memory address associated with the write command. The device may also update the validity bit for row y in the register 320-*a* reflect that row y stores valid data. The device 300 may also update the dirty bit for row y in the register 320-*a* to reflect that row y now stores dirty data (e.g., if the device 300 is operating in write-back mode). After updating the storage information for row y in the register 320-*a*, the device 300 may communicate the updated storage information for row y to the array 315-*a* so that the register 320-*a* is available for use in a subsequent access process.

In some examples, the device 300 may update the dirty information for row y in the register 320-*b* to reflect the dirty status for portions of row y after writing the provided data. After updating the dirty information for row y in the register 320-*b*, the device 300 may communicate the updated dirty information for row y to the array 315-*b* so that the register 320-*b* is available for use in a subsequent access process.

Figure 6:
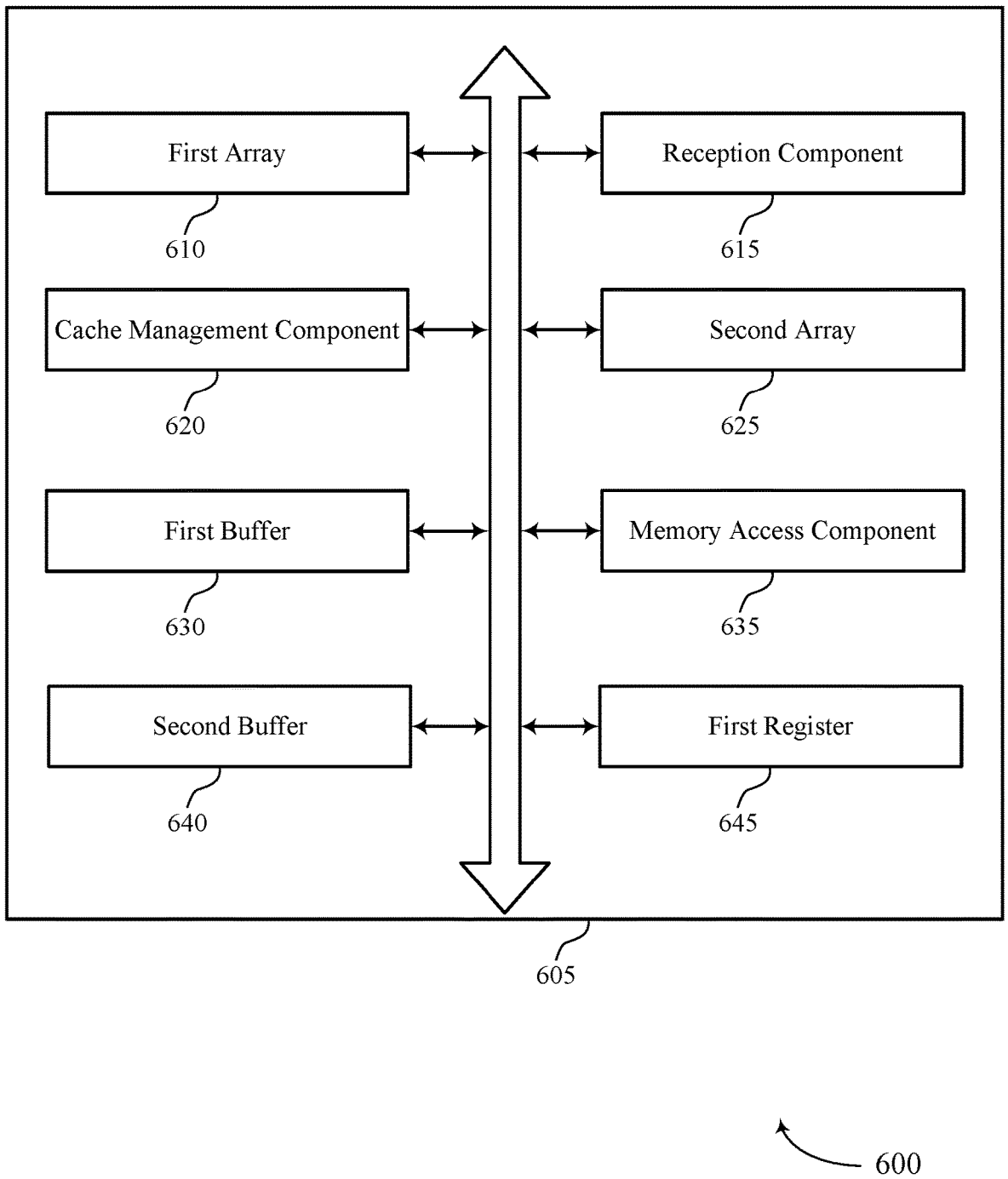
FIG. 6 shows a block diagram of a device that supports metadata management for a cache in accordance with aspects of the present disclosure.

FIG. 6 shows a block diagram 600 of a device 605 that supports metadata management for a cache in accordance with examples as disclosed herein. The device 605 may be an example of aspects of a memory subsystem 110, memory subsystem 200, interface controller, 115, interface controller 202, or device 300 as described herein. The device 605 may include a first array 610, a reception component 615, a cache management component 620, a second array 625, first buffer 630, a memory access component 635, a second buffer 640, and a first register 645. Each of these components may communicate, directly or indirectly, with one another (e.g., via one or more buses).

In a first example, the reception component 615 may receive from a host device, an activate command. In some examples, the reception component 615 may be or include a bus interface, logic, circuitry, a processor, a controller, or other components capable of performing the functions described herein. The first array 610 may communicate storage information for a row of the volatile memory from the first array 610 to the first register 645 based at least in part on the activate command being associated with the row. The first array 610 may be or include an array, a sub-array, a memory, a buffer, a bus interface, logic, circuitry, a processor, a controller, or other component capable of performing the functions described herein. The reception component 615 may receive, from the host device, a read command associated with the row of the volatile memory. The cache management component 620 may determine, based at least in part on the storage information in the first register 645, whether data requested by the read command is stored in the row of the volatile memory. The cache management component 620 may be or include logic, circuitry, a processor, a controller, or other components capable of performing the functions described herein.

In some examples, the cache management component 620 may determine that the data requested by the read command is stored in the row of the volatile memory (e.g., the cache management component 620 may determine that there is a read hit). In some examples, the second array 625 may communicate, based at least in part on determining that the data is stored in the row, validity information for the row of the volatile memory from a second array to the first register 645. The second array 625 may be or include an array, a sub-array, a memory, a buffer, a bus interface, logic, circuitry, a processor, a controller, or other component capable of performing the functions described herein. In some examples, the cache management component 620 may determine, based at least in part on the validity information for the row in the first register 645, one or more subsets of memory cells in the row that store the data. In some examples, the first buffer 630 may communicate the data stored in the one or more subsets of memory cells to the host device based at least in part on determining that the one or more subsets of memory cells in the row store the data. The first buffer 630 may be or include an array, a sub-array, a memory, a buffer, a bus interface, logic, circuitry, a processor, a controller, or other component capable of performing the functions described herein.

In some examples, the cache management component 620 may determine that the data requested by the read command is absent from the row of the volatile memory (e.g., the cache management component 620 may determine a read miss). In some examples, the second array 625 may communicate, based at least in part on determining that the data is absent from the row, dirty information for the row of the volatile memory from a second array to a second register. The second register may be or include a register, an array, a sub-array, a memory, a buffer, a bus interface, logic, circuitry, a processor, a controller, or other component capable of performing the functions described herein. In some examples, the cache management component 620 may determine, based at least in part on the dirty information for the row in the second register, one or more subsets of memory cells in the row that store dirty data. In some examples, the second buffer 640 may communicate the dirty data stored in the one or more subsets of memory cells to the non-volatile memory based at least in part on determining that the one or more subsets of memory cells in the row store the dirty data. The second buffer 640 may be or include an array, a sub-array, a memory, a buffer, a bus interface, logic, circuitry, a processor, a controller, or other component capable of performing the functions described herein.

In some examples, the cache management component 620 may select, for communication from the first array to the first register 645, the storage information for the row based at least in part on the storage information for the row indicating that the row stores data from a non-volatile memory address indicated by the activate command.

In some examples, the cache management component 620 may determine, based at least in part on additional storage information in the first array, that the requested data is absent from the volatile memory. In some examples, the cache management component 620 may select, for communicating from the first array to the first register 645, the storage information for the row based at least in part on the storage information for the row indicating that the row stores invalid data.

In some examples, the memory access component 635 may activate the row of the volatile memory based at least in part on communicating the storage information for the row from the first array to the first register 645. The memory access component 635 may be or include logic, circuitry, a processor, a controller, or other components capable of performing the functions described herein.

In some examples, the activate command targets an address of the non-volatile memory. In some examples, the cache management component 620 may determine a set of rows of the volatile memory associated with the address of the non-volatile memory, wherein the row of the volatile memory is a row in the set of rows.

In a second example, the reception component 615 may receive, from a host device, an activate command. The first array 610 may communicate storage information for a row of the volatile memory from a first array to a first register 645 based at least in part on the activate command being associated with the row. The reception component 615 may receive, from the host device, a write command associated with the row of the volatile memory. The cache management component 620 may determine, based at least in part on the storage information in the first register 645, whether the row of the volatile memory stores data from an address, of the non-volatile memory, associated with the write command.

In some examples, the cache management component 620 may determine that the row of the volatile memory stores data from the address of the non-volatile memory associated with the write command (e.g., the cache management component 620 may determine a write hit). In some examples, the second array 625 may communicate, based at least in part on determining that the row stores data from the address of the non-volatile memory, dirty information for the row of the volatile memory from a second array to the first register 645. In some examples, the memory access component 635 may store, based at least in part on determining that the row stores data from the address of the non-volatile memory, the data associated with the write command in the row of the volatile memory. In some examples, the first register 645 may update, based at least in part on storing the data in the row, the dirty information for the row in the first register 645 before returning the dirty information to the second array. The first register 645 may be or include a register, an array, a sub-array, a memory, a buffer, a bus interface, logic, circuitry, a processor, a controller, or other component capable of performing the functions described herein. In some examples, the second array 625 may communicate, based at least in part on determining that the row stores data from the address of the non-volatile memory, validity information for the row of the volatile memory from the second array to the first register 645. In some examples, the first register 645 may update, based at least in part on storing the data associated with the write command in the row, the validity information for the row in the first register 645 before returning the validity information to the second array.

In some examples, the cache management component 620 may determine that the row of the volatile memory does not store data from the address of the non-volatile memory associated with the write command (e.g., the cache management component 620 may determine a write miss). In some examples, the second array 625 may communicate, based at least in part on determining that the row does not store the data, dirty information for the row of the volatile memory from a second array to a second register. In some examples, the cache management component 620 may determine, based at least in part on the dirty information for the row in the second register, one or more sets of memory cells in the row that store dirty data. In some examples, the second buffer 640 may communicate the dirty data stored in the one or more sets of memory cells to the non-volatile memory based at least in part on determining that the one or more sets of memory cells in the row store the dirty data.

In some examples, the activate command is associated with the address of the non-volatile memory. In some examples, the cache management component 620 may determine, based at least in part on the activate command and the storage information for the row in the first array, that the row stores data from the address of the non-volatile memory. In some examples, the cache management component 620 may select, for communication from the first array to the first register 645, the storage information for the row based at least in part on the storage information for the row indicating that the row stores data from the address of the non-volatile memory.

In some examples, the activate command is associated with the address of the non-volatile memory. In some examples, the cache management component 620 may determine, based at least in part on the activate command and additional storage information in the first array, that no row in the volatile memory stores data from the address of the non-volatile memory. In some examples, the cache management component 620 may select, for communication from the first array to the first register 645, the storage information for the row based at least in part on the storage information for the row indicating that the row stores invalid data.

In some examples, the memory access component 635 may activate the row of the volatile memory based at least in part on communicating the storage information for the row from the first array to the first register 645.

In some examples, the activate command targets an address of the non-volatile memory. In some examples, the cache management component 620 may determine a set of rows of the volatile memory associated with the address of the non-volatile memory, wherein the row of the volatile memory is a row in the set of rows.

In a third example, the reception component 615 may receive, from a host device, an activate command associated with a row of the volatile memory. The first array 610 may communicate storage information for the row of the volatile memory from a first array to a first register 645 based at least in part on the activate command. The reception component 615 may receive, from the host device, an access command associated with the row of the volatile memory. The second array 625 may communicate, based at least in part on the access command and the storage information in the first register 645, validity information for the row from a second array to the first register 645 or dirty information for the row from the second array to a second register.

In some examples, the access command is associated with an address of the non-volatile memory. In some examples, the cache management component 620 may determine, based at least in part on the storage information for the row in the first register 645, that the row stores data from the address of the non-volatile memory, wherein the validity information for the row is communicated from the second array to the first register 645 based at least in part on the determination.

In some examples, the access command is associated with an address of the non-volatile memory. In some examples, the cache management component 620 may determine, based at least in part on the storage information for the row in the first register 645, that the row does not store data from the address of the non-volatile memory, wherein the dirty information for the row is communicated from the second array to the second register based at least in part on the determination.

Figure 7:
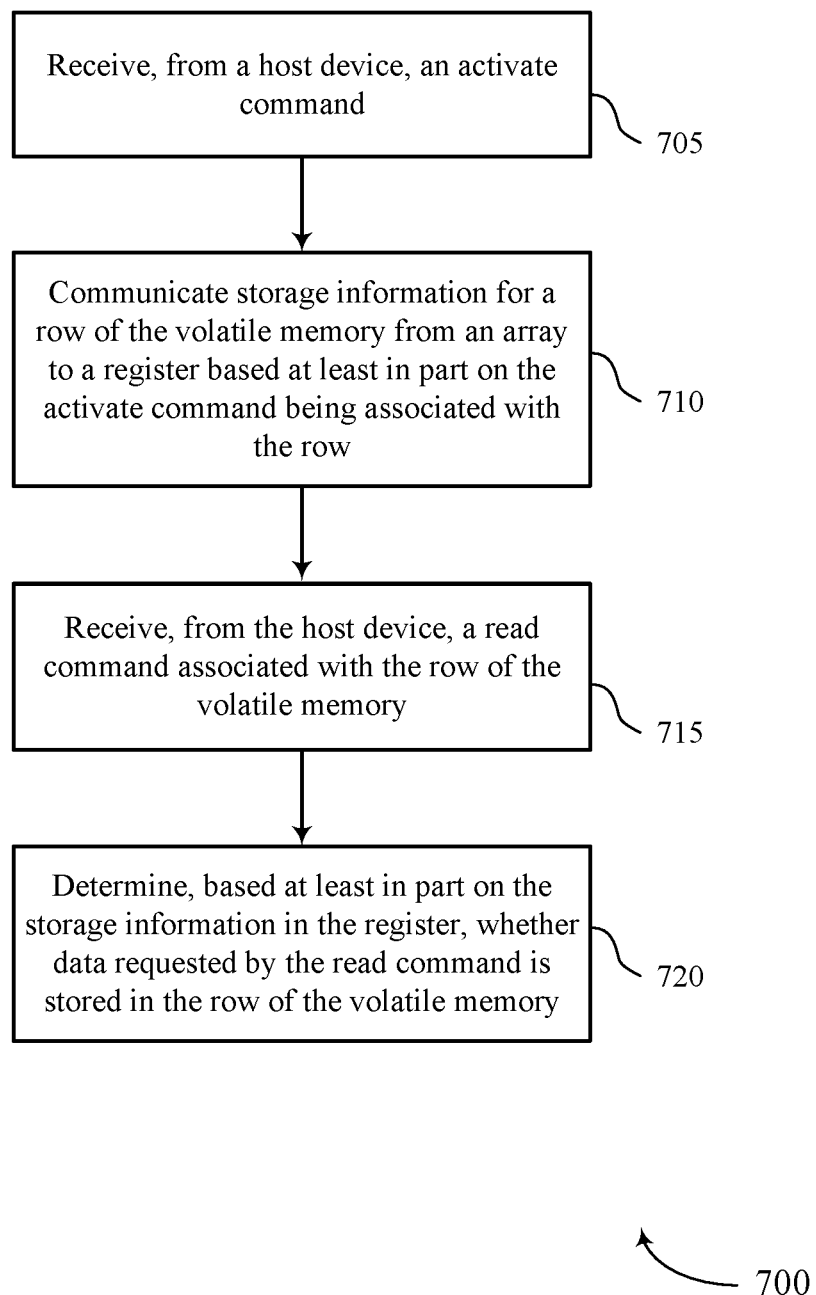
FIGS. 7 through 9 show flowcharts illustrating a method or methods that support metadata management for a cache in accordance with examples as disclosed herein.

FIG. 7 shows a flowchart illustrating a method or methods 700 that supports metadata management for a cache in accordance with aspects of the present disclosure. The operations of method 700 may be implemented by a memory device or its components as described herein. For example, the operations of method 700 may be performed by a memory device as described with reference to FIGS. 1 through 6. In some examples, a memory device may execute a set of instructions to control the functional elements of the memory device to perform the described functions. Additionally or alternatively, a memory device may perform aspects of the described functions using special-purpose hardware.

In some examples, the operations of method 700 may be implemented by an apparatus that include a volatile memory configured to operate as a cache for a non-volatile memory and an interface controller coupled with the volatile memory and the non-volatile memory. The interface controller operable to cause the apparatus to perform the operations of method 700.

At 705, the method may include receiving, from a host device, an activate command. The operations of 705 may be performed according to the methods described herein. In some examples, aspects of the operations of 705 may be performed by a reception component described with reference to FIG. 6.

At 710, the method may include communicating storage information for a row of the volatile memory from an array to a register based at least in part on the activate command being associated with the row. The operations of 710 may be performed according to the methods described herein. In some examples, aspects of the operations of 710 may be performed by a first array communication component as described with reference to FIG. 6.

At 715, the method may include receiving, from the host device, a read command associated with the row of the volatile memory. The operations of 715 may be performed according to the methods described herein. In some examples, aspects of the operations of 715 may be performed by a reception component as described with reference to FIG. 6.

At 720, the method may include determining, based at least in part on the storage information in the register, whether data requested by the read command is stored in the row of the volatile memory. The operations of 720 may be performed according to the methods described herein. In some examples, aspects of the operations of 720 may be performed by cache management component as described with reference to FIG. 6.

In some examples, an apparatus as described herein may perform a method or methods, such as the method 700. The apparatus may include features, means, or instructions (e.g., a non-transitory computer-readable medium storing instructions executable by a processor) for receiving, from a host device, an activate command; communicating storage information for a row of the volatile memory from an array to a register based at least in part on the activate command being associated with the row; receiving, from the host device, a read command associated with the row of the volatile memory; and determining, based at least in part on the storage information in the register, whether data requested by the read command is stored in the row of the volatile memory.

Some examples of the method 700 and the apparatus described herein may further include operations, features, means, or instructions for determining that the data requested by the read command is stored in the row of the volatile memory. Some examples of the method 700 and the apparatus described herein may further include operations, features, means, or instructions for communicating, based at least in part on determining that the data is stored in the row, validity information for the row of the volatile memory from a second array to the register.

Some examples of the method 700 and the apparatus described herein may further include operations, features, means, or instructions for determining, based on the validity information for the row in the register, one or more subsets of memory cells in the row that store the data. Some examples of the method 700 and the apparatus described herein may further include operations, features, means, or instructions for communicating the data stored in the one or more subsets of memory cells to the host device based on determining that the one or more subsets of memory cells in the row store the data.

Some examples of the method 700 and the apparatus described herein may further include operations, features, means, or instructions for determining that the data requested by the read command may be absent from the row of the volatile memory. Some examples of the method 700 and the apparatus described herein may further include operations, features, means, or instructions for communicating, based on determining that the data may be absent from the row, dirty information for the row of the volatile memory from a second array to a second register. Some examples of the method 700 and the apparatus described herein may further include operations, features, means, or instructions for determining, based on the dirty information for the row in the second register, one or more subsets of memory cells in the row that store dirty data. Some examples of the method 700 and the apparatus described herein may further include operations, features, means, or instructions for communicating the dirty data stored in the one or more subsets of memory cells to the non-volatile memory based on determining that the one or more subsets of memory cells in the row store the dirty data.

Some examples of the method 700 and the apparatus described herein may further include operations, features, means, or instructions for selecting, for communication from the array to the register, the storage information for the row based on the storage information for the row indicating that the row stores data from a non-volatile memory address indicated by the activate command.

Some examples of the method 700 and the apparatus described herein may further include operations, features, means, or instructions for determining, based on additional storage information in the array, that the requested data may be absent from the volatile memory. Some examples of the method 700 and the apparatus described herein may further include operations, features, means, or instructions for selecting, for communicating from the array to the register, the storage information for the row based on the storage information for the row indicating that the row stores invalid data.

Some examples of the method 700 and the apparatus described herein may further include operations, features, means, or instructions for activating the row of the volatile memory based on communicating the storage information for the row from the array to the register.

Some examples of the method 700 and the apparatus described herein may further include operations, features, means, or instructions for determining a set of rows of the volatile memory associated with the address of the non-volatile memory, where the row of the volatile memory may be a row in the set of rows.

Figure 8:
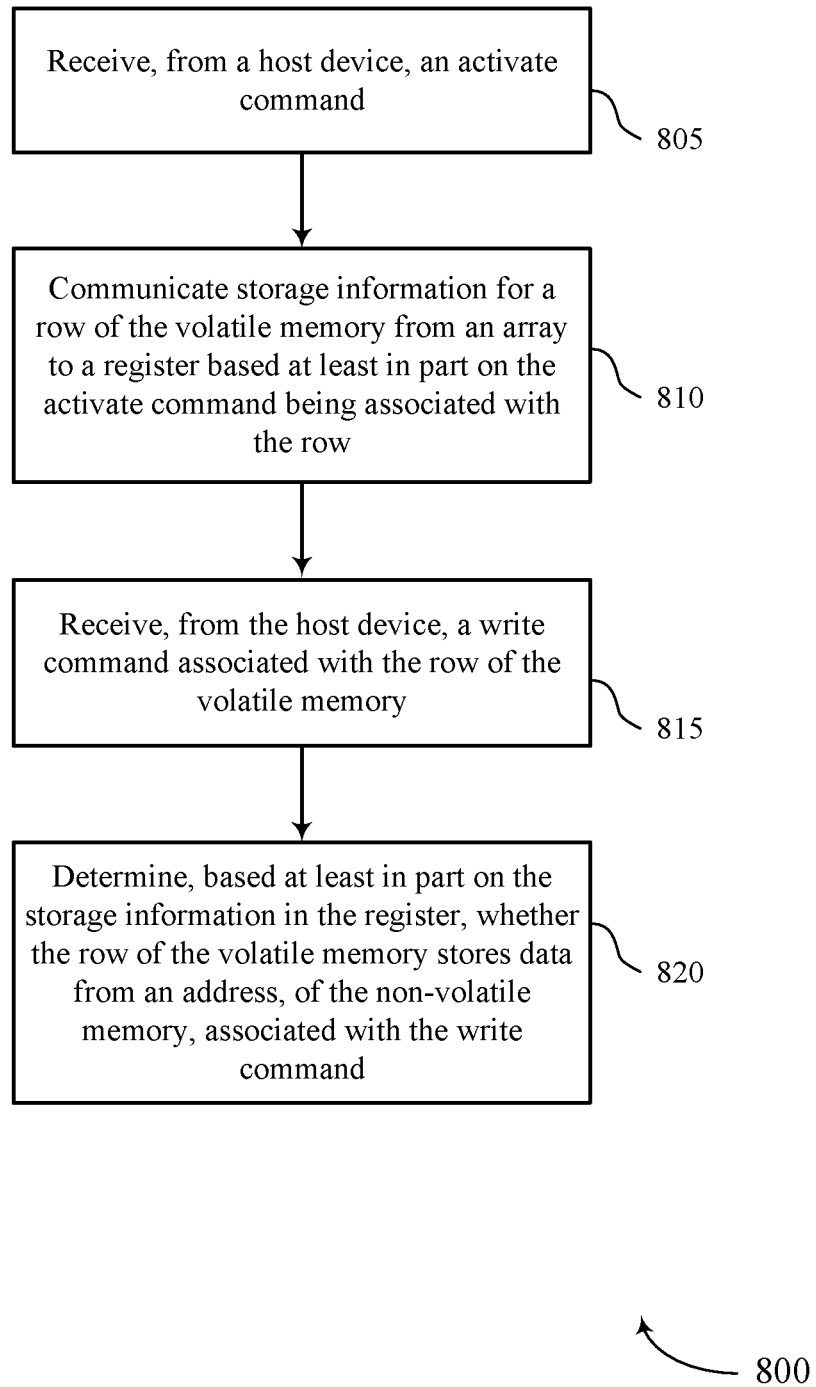

FIG. 8 shows a flowchart illustrating a method or methods 800 that supports metadata management for a cache in accordance with aspects of the present disclosure. The operations of method 800 may be implemented by a memory device or its components as described herein. For example, the operations of method 800 may be performed by a memory device as described with reference to FIGS. 1 through 6. In some examples, a memory device may execute a set of instructions to control the functional elements of the memory device to perform the described functions. Additionally or alternatively, a memory device may perform aspects of the described functions using special-purpose hardware.

In some examples, the operations of method 800 may be implemented by an apparatus that include a volatile memory configured to operate as a cache for a non-volatile memory and an interface controller coupled with the volatile memory and the non-volatile memory. The interface controller operable to cause the apparatus to perform the operations of method 800.

At 805, the method may include receiving, from a host device, an activate command. The operations of 805 may be performed according to the methods described herein. In some examples, aspects of the operations of 805 may be performed by a reception component as described with reference to FIG. 6.

At 810, the method may include communicating storage information for a row of the volatile memory from an array to a register based at least in part on the activate command being associated with the row. The operations of 810 may be performed according to the methods described herein. In some examples, aspects of the operations of 810 may be performed by a first array communication component as described with reference to FIG. 6.

At 815, the method may include receiving, from the host device, a write command associated with the row of the volatile memory. The operations of 815 may be performed according to the methods described herein. In some examples, aspects of the operations of 815 may be performed by a reception component as described with reference to FIG. 6.

At 820, the method may include determining, based at least in part on the storage information in the register, whether the row of the volatile memory stores data from an address, of the non-volatile memory, associated with the write command. The operations of 820 may be performed according to the methods described herein. In some examples, aspects of the operations of 820 may be performed by a cache management component as described with reference to FIG. 6.

In some examples, an apparatus as described herein may perform a method or methods, such as the method 800. The apparatus may include features, means, or instructions (e.g., a non-transitory computer-readable medium storing instructions executable by a processor) for receiving, from a host device, an activate command; communicating storage information for a row of the volatile memory from an array to a register based at least in part on the activate command being associated with the row; receiving, from the host device, a read command associated with the row of the volatile memory; and determining, based at least in part on the storage information in the register, whether data requested by the read command is stored in the row of the volatile memory.

Some examples of the method 800 and the apparatus described herein may further include operations, features, means, or instructions for receiving, from a host device, an activate command; communicating storage information for a row of the volatile memory from an array to a register based at least in part on the activate command being associated with the row; receiving, from the host device, a write command associated with the row of the volatile memory; and determining, based at least in part on the storage information in the register, whether the row of the volatile memory stores data from an address, of the non-volatile memory, associated with the write command.

Some examples of the method 800 and the apparatus described herein may further include operations, features, means, or instructions for determining that the row of the volatile memory stores data from the address of the non-volatile memory associated with the write command. Some examples of the method 800 and the apparatus described herein may further include operations, features, means, or instructions for communicating, based on determining that the row stores data from the address of the non-volatile memory, dirty information for the row of the volatile memory from a second array to the register.

Some examples of the method 800 and the apparatus described herein may further include operations, features, means, or instructions for determining that the row stores data from the address of the non-volatile memory, the data associated with the write command in the row of the volatile memory. Some examples of the method 800 and the apparatus described herein may further include operations, features, means, or instructions for updating, based on storing the data in the row, the dirty information for the row in the register before returning the dirty information to the second array.

Some examples of the method 800 and the apparatus described herein may further include operations, features, means, or instructions for communicating, based on determining that the row stores data from the address of the non-volatile memory, validity information for the row of the volatile memory from the second array to the register. Some examples of the method 800 and the apparatus described herein may further include operations, features, means, or instructions for updating, based on storing the data associated with the write command in the row, the validity information for the row in the register before returning the validity information to the second array.

Some examples of the method 800 and the apparatus described herein may further include operations, features, means, or instructions for determining that the row of the volatile memory does not store data from the address of the non-volatile memory associated with the write command. Some examples of the method 800 and the apparatus described herein may further include operations, features, means, or instructions for communicating, based on determining that the row does not store the data, dirty information for the row of the volatile memory from a second array to a second register.

Some examples of the method 800 and the apparatus described herein may further include operations, features, means, or instructions for determining, based on the dirty information for the row in the second register, one or more sets of memory cells in the row that store dirty data. Some examples of the method 800 and the apparatus described herein may further include operations, features, means, or instructions for communicating the dirty data stored in the one or more sets of memory cells to the non-volatile memory based on determining that the one or more sets of memory cells in the row store the dirty data.

In some examples of the method 800 and the apparatus described herein, the activate command is associated with the address of the non-volatile memory. Some examples of the method 800 and the apparatus described herein may further include operations, features, means, or instructions for determining, based on the activate command and the storage information for the row in the array, that the row stores data from the address of the non-volatile memory. Some examples of the method 800 and the apparatus described herein may further include operations, features, means, or instructions for selecting, for communication from the array to the register, the storage information for the row based on the storage information for the row indicating that the row stores data from the address of the non-volatile memory.

In some examples of the method 800 and the apparatus described herein, the activate command is associated with the address of the non-volatile memory. Some examples of the method 800 and the apparatus described herein may further include operations, features, means, or instructions for determining, based on the activate command and additional storage information in the array, that no row in the volatile memory stores data from the address of the non-volatile memory. Some examples of the method 800 and the apparatus described herein may further include operations, features, means, or instructions for selecting, for communication from the array to the register, the storage information for the row based on the storage information for the row indicating that the row stores invalid data.

Some examples of the method 800 and the apparatus described herein may further include operations, features, means, or instructions for activating the row of the volatile memory based on communicating the storage information for the row from the array to the register.

Some examples of the method 800 and the apparatus described herein may further include operations, features, means, or instructions for determining a set of rows of the volatile memory associated with the address of the non-volatile memory, where the row of the volatile memory may be a row in the set of rows.

Figure 9:
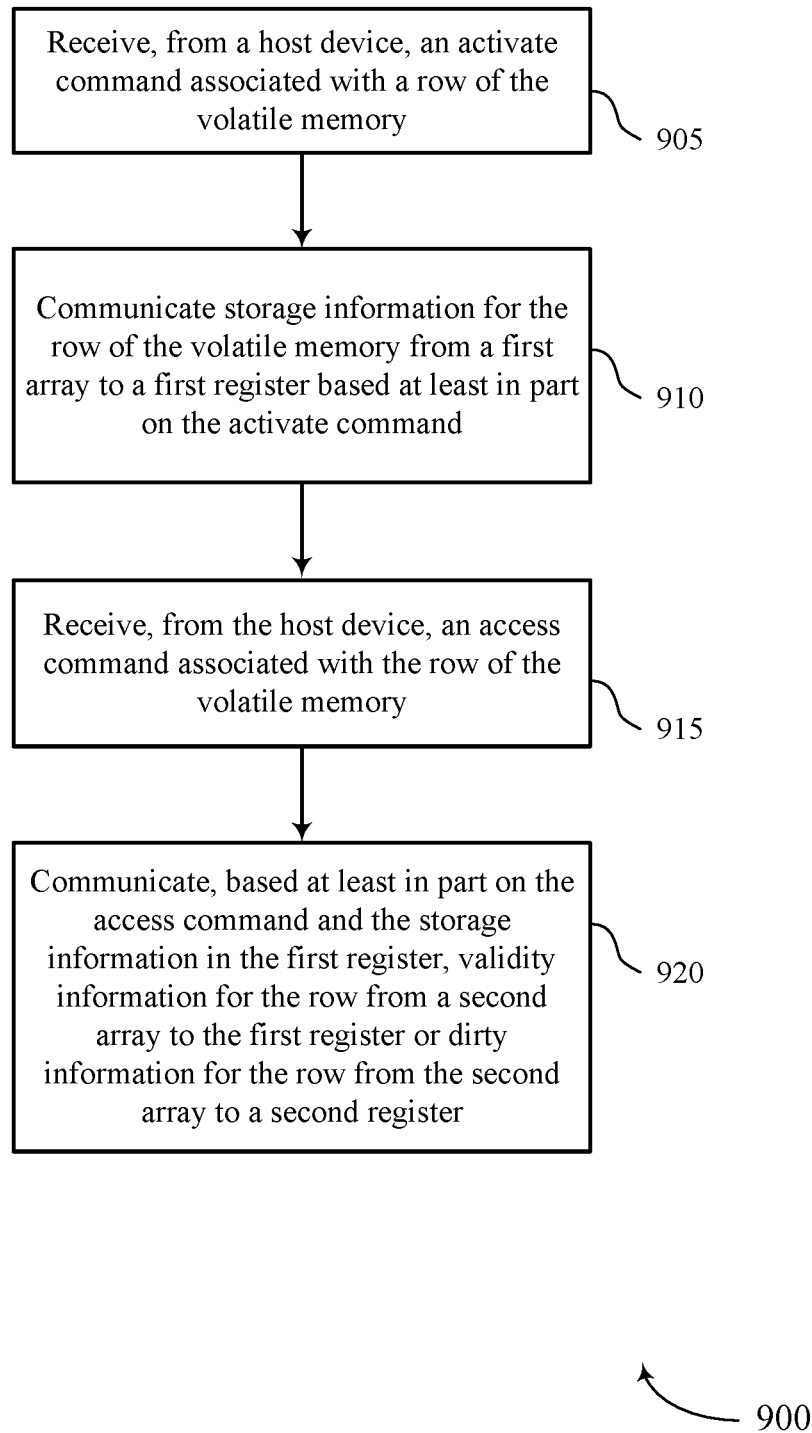

FIG. 9 shows a flowchart illustrating a method or methods 900 that supports metadata management for a cache in accordance with aspects of the present disclosure. The operations of method 900 may be implemented by a memory device or its components as described herein. For example, the operations of method 900 may be performed by a memory device as described with reference to FIGS. 1 through 6. In some examples, a memory device may execute a set of instructions to control the functional elements of the memory device to perform the described functions. Additionally or alternatively, a memory device may perform aspects of the described functions using special-purpose hardware.

In some examples, the operations of method 900 may be implemented by an apparatus that include a volatile memory configured to operate as a cache for a non-volatile memory and an interface controller coupled with the volatile memory and the non-volatile memory. The interface controller operable to cause the apparatus to perform the operations of method 900.

At 905, the method may include receiving, from a host device, an activate command associated with a row of the volatile memory. The operations of 905 may be performed according to the methods described herein. In some examples, aspects of the operations of 905 may be performed by a reception component as described with reference to FIG. 6.

At 910, the method may include communicating storage information for the row of the volatile memory from a first array to a first register based at least in part on the activate command. The operations of 910 may be performed according to the methods described herein. In some examples, aspects of the operations of 910 may be performed by a first array communication component as described with reference to FIG. 6.

At 915, the method may include receiving, from the host device, an access command associated with the row of the volatile memory. The operations of 915 may be performed according to the methods described herein. In some examples, aspects of the operations of 915 may be performed by a reception component as described with reference to FIG. 6.

At 920, the method may include communicating, based at least in part on the access command and the storage information in the first register, validity information for the row from a second array to the first register or dirty information for the row from the second array to a second register. The operations of 920 may be performed according to the methods described herein. In some examples, aspects of the operations of 920 may be performed by a first array communication component as described with reference to FIG. 6.

In some examples, an apparatus as described herein may perform a method or methods, such as the method 900. The apparatus may include features, means, or instructions (e.g., a non-transitory computer-readable medium storing instructions executable by a processor) for receiving, from a host device, an activate command associated with a row of the volatile memory; communicating storage information for the row of the volatile memory from a first array to a first register based at least in part on the activate command; receiving, from the host device, an access command associated with the row of the volatile memory; and communicating, based at least in part on the access command and the storage information in the first register, validity information for the row from a second array to the first register or dirty information for the row from the second array to a second register.

Some examples of the method 800 and the apparatus described herein may further include operations, features, means, or instructions for determining, based on the storage information for the row in the first register, that the row stores data from the address of the non-volatile memory, where the validity information for the row may be communicated from the second array to the first register based on the determination.

Some examples of the method 800 and the apparatus described herein may further include operations, features, means, or instructions for determining, based on the storage information for the row in the first register, that the row does not store data from the address of the non-volatile memory, where the dirty information for the row may be communicated from the second array to the second register based on the determination.

It should be noted that the methods described above describe possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

A protocol may define one or more communication procedures and one or more communication parameters supported for use by a device or component. For example, a protocol may define various operations, a timing and a frequency for those operations, a meaning of various commands or signals or both, one or more addressing scheme(s) for one or more memories, a type of communication for which pins are reserved, a size of data handled at various components such as interfaces, a data rate supported by various components such as interfaces, or a bandwidth supported by various components such as interfaces, among other parameters and metrics, or any combination thereof. Use of a shared protocol may enable interaction between devices because each device may operate in a manner expected, recognized, and understood by another device. For example, two devices that support the same protocol may interact according to the policies, procedures, and parameters defined by the protocol, whereas two devices that support different protocols may be incompatible.

To illustrate, two devices that support different protocols may be incompatible because the protocols define different addressing schemes (e.g., different quantities of address bits). As another illustration, two devices that support different protocols may be incompatible because the protocols define different transfer procedures for responding to a single command (e.g., the burst length or quantity of bytes permitted in response to the command may differ). Merely translating a command to an action should not be construed as use of two different protocols. Rather, two protocols may be considered different if corresponding procedures or parameters defined by the protocols vary. For example, a device may be said to support two different protocols if the device supports different addressing schemes, or different transfer procedures for responding to a command.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   a volatile memory configured to operate as a cache for a non-volatile memory; and
   an interface controller coupled with the volatile memory and the non-volatile memory, the interface controller operable to cause the apparatus to:
   receive, from a host device, an activate command;
   communicate storage information for a row of the volatile memory from an array to a register based at least in part on the activate command being associated with the row;
   receive, from the host device, a read command associated with the row of the volatile memory; and
   determine, based at least in part on the storage information in the register, whether data requested by the read command is stored in the row of the volatile memory.

2. The apparatus of claim 1, wherein the interface controller is operable to cause the apparatus to:
   determine that the data requested by the read command is stored in the row of the volatile memory; and
   communicate, based at least in part on determining that the data is stored in the row, validity information for the row of the volatile memory from a second array to the register.

3. The apparatus of claim 2, wherein the interface controller is operable to cause the apparatus to:
   determine, based at least in part on the validity information for the row in the register, one or more subsets of memory cells in the row that store the data; and
   communicate the data stored in the one or more subsets of memory cells to the host device based at least in part on determining that the one or more subsets of memory cells in the row store the data.

4. The apparatus of claim 1, wherein the interface controller is operable to cause the apparatus to:
   determine that the data requested by the read command is absent from the row of the volatile memory; and
   communicate, based at least in part on determining that the data is absent from the row, dirty information for the row of the volatile memory from a second array to a second register.

5. The apparatus of claim 4, wherein the interface controller is operable to cause the apparatus to:
   determine, based at least in part on the dirty information for the row in the second register, one or more subsets of memory cells in the row that store dirty data; and
   communicate the dirty data stored in the one or more subsets of memory cells to the non-volatile memory based at least in part on determining that the one or more subsets of memory cells in the row store the dirty data.

6. The apparatus of claim 1, wherein the interface controller is operable to cause the apparatus to:
select, for communication from the array to the register, the storage information for the row based at least in part on the storage information for the row indicating that the row stores data from a non-volatile memory address indicated by the activate command.

7. The apparatus of claim 1, wherein the interface controller is operable to cause the apparatus to:
determine, based at least in part on additional storage information in the array, that the requested data is absent from the volatile memory; and
select, for communicating from the array to the register, the storage information for the row based at least in part on the storage information for the row indicating that the row stores invalid data.

8. The apparatus of claim 1, wherein the interface controller is operable to cause the apparatus to:
activate the row of the volatile memory based at least in part on communicating the storage information for the row from the array to the register.

9. The apparatus of claim 1, wherein the activate command targets an address of the non-volatile memory, and wherein the interface controller is operable to cause the apparatus to:
determine a set of rows of the volatile memory associated with the address of the non-volatile memory, wherein the row of the volatile memory is in the set of rows.

10. An apparatus, comprising:
a volatile memory configured to operate as a cache for a non-volatile memory; and
an interface controller coupled with the volatile memory and the non-volatile memory, the interface controller operable to cause the apparatus to:
receive, from a host device, an activate command;
communicate storage information for a row of the volatile memory from an array to a register based at least in part on the activate command being associated with the row;
receive, from the host device, a write command associated with the row of the volatile memory; and
determine, based at least in part on the storage information in the register, whether the row of the volatile memory stores data from an address, of the non-volatile memory, associated with the write command.

11. The apparatus of claim 10, wherein the interface controller is operable to cause the apparatus to:
determine that the row of the volatile memory stores data from the address of the non-volatile memory associated with the write command; and
communicate, based at least in part on determining that the row stores data from the address of the non-volatile memory, dirty information for the row of the volatile memory from a second array to the register.

12. The apparatus of claim 11, wherein the interface controller is operable to cause the apparatus to:
store, based at least in part on determining that the row stores data from the address of the non-volatile memory, the data associated with the write command in the row of the volatile memory; and
update, based at least in part on storing the data in the row, the dirty information for the row in the register before returning the dirty information to the second array.

13. The apparatus of claim 12, wherein the interface controller is operable to cause the apparatus to:
communicate, based at least in part on determining that the row stores data from the address of the non-volatile memory, validity information for the row of the volatile memory from the second array to the register; and
update, based at least in part on storing the data associated with the write command in the row, the validity information for the row in the register before returning the validity information to the second array.

14. The apparatus of claim 10, wherein the interface controller is operable to cause the apparatus to:
determine that the row of the volatile memory does not store data from the address of the non-volatile memory associated with the write command; and
communicate, based at least in part on determining that the row does not store the data, dirty information for the row of the volatile memory from a second array to a second register.

15. The apparatus of claim 14, wherein the interface controller is operable to cause the apparatus to:
determine, based at least in part on the dirty information for the row in the second register, one or more sets of memory cells in the row that store dirty data; and
communicate the dirty data stored in the one or more sets of memory cells to the non-volatile memory based at least in part on determining that the one or more sets of memory cells in the row store the dirty data.

16. The apparatus of claim 10, wherein the activate command is associated with the address of the non-volatile memory, and wherein the interface controller is operable to cause the apparatus to:
determine, based at least in part on the activate command and the storage information for the row in the array, that the row stores data from the address of the non-volatile memory; and
select, for communication from the array to the register, the storage information for the row based at least in part on the storage information for the row indicating that the row stores data from the address of the non-volatile memory.

17. The apparatus of claim 10, wherein the activate command is associated with the address of the non-volatile memory, and wherein the interface controller is operable to cause the apparatus to:
determine, based at least in part on the activate command and additional storage information in the array, that no row in the volatile memory stores data from the address of the non-volatile memory; and
select, for communication from the array to the register, the storage information for the row based at least in part on the storage information for the row indicating that the row stores invalid data.

18. The apparatus of claim 10, wherein the interface controller is operable to cause the apparatus to:
activate the row of the volatile memory based at least in part on communicating the storage information for the row from the array to the register.

19. The apparatus of claim 10, wherein the activate command targets an address of the non-volatile memory, and wherein the interface controller is operable to cause the apparatus to:
determine a set of rows of the volatile memory associated with the address of the non-volatile memory, wherein the row of the volatile memory is in the set of rows.

20. An apparatus, comprising:
a volatile memory configured to operate as a cache for a non-volatile memory; and
an interface controller coupled with the volatile memory and the non-volatile memory, the interface controller operable to cause the apparatus to:
  receive, from a host device, an activate command associated with a row of the volatile memory;
  communicate storage information for the row of the volatile memory from a first array to a first register based at least in part on the activate command;
  receive, from the host device, an access command associated with the row of the volatile memory; and
  communicate, based at least in part on the access command and the storage information in the first register, validity information for the row from a second array to the first register or dirty information for the row from the second array to a second register.

21. The apparatus of claim 20, wherein the access command is associated with an address of the non-volatile memory, and wherein the interface controller is operable to cause the apparatus to:
  determine, based at least in part on the storage information for the row in the first register, that the row stores data from the address of the non-volatile memory, wherein the validity information for the row is communicated from the second array to the first register based at least in part on the determination.

22. The apparatus of claim 20, wherein the access command is associated with an address of the non-volatile memory, and wherein the interface controller is operable to cause the apparatus to:
  determine, based at least in part on the storage information for the row in the first register, that the row does not store data from the address of the non-volatile memory, wherein the dirty information for the row is communicated from the second array to the second register based at least in part on the determination.

* * * * *